US010310592B2

(12) United States Patent
Imata

(10) Patent No.: US 10,310,592 B2
(45) Date of Patent: Jun. 4, 2019

(54) DEVICE, OPERATION-MODE CONTROL METHOD, AND RECORDING MEDIUM

(71) Applicant: Futa Imata, Kanagawa (JP)

(72) Inventor: Futa Imata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 165 days.

(21) Appl. No.: 15/336,283

(22) Filed: Oct. 27, 2016

(65) Prior Publication Data

US 2017/0123485 A1    May 4, 2017

(30) Foreign Application Priority Data

Nov. 2, 2015   (JP) .................. 2015-215682
Sep. 13, 2016  (JP) .................. 2016-178582

(51) Int. Cl.

| G06F 1/00 | (2006.01) |
|---|---|
| G06F 1/3296 | (2019.01) |
| H04L 12/26 | (2006.01) |
| G06F 1/3209 | (2019.01) |
| G06F 1/3287 | (2019.01) |
| G06F 1/3234 | (2019.01) |
| H04N 1/00 | (2006.01) |

(52) U.S. Cl.
CPC .......... *G06F 1/3296* (2013.01); *G06F 1/3209* (2013.01); *G06F 1/3243* (2013.01); *G06F 1/3287* (2013.01); *H04L 43/0811* (2013.01); *H04N 1/00888* (2013.01); *Y02D 10/152* (2018.01); *Y02D 10/171* (2018.01); *Y02D 10/172* (2018.01)

(58) Field of Classification Search
CPC .... G06F 1/3296; G06F 1/3243; G06F 1/3287; G06F 1/3209; H04L 43/0811
See application file for complete search history.

(56) References Cited

U.S. PATENT DOCUMENTS

| 2006/0059380 A1* | 3/2006 | Kimura ............... G06F 11/1441 713/323 |
| 2007/0183786 A1 | 8/2007 | Hinosugi et al. |
| 2010/0262851 A1* | 10/2010 | Chien ..................... H04L 12/12 713/320 |

(Continued)

FOREIGN PATENT DOCUMENTS

| JP | 11-088352 | 3/1999 |
| JP | 2000-115222 | 4/2000 |

(Continued)

*Primary Examiner* — Xuxing Chen
(74) *Attorney, Agent, or Firm* — Oblon, McClelland, Maier & Neustadt, L.L.P.

(57) ABSTRACT

A device has a plurality of power states. The device includes: a communication processor configured to communicate with a communication destination device connected via a cable; a confirmation-signal receiver configured to receive a connection confirmation signal that is transmitted if being connected to the communication destination device via the cable; a contoller configured to determine a power state depending on whether the confirmation-signal receiver receives the connection confirmation signal; and a power circuit configured to control supply of electric power to at least one of the communication processor and the contoller in accordance with the power state determined by the contoller.

15 Claims, 44 Drawing Sheets

(56) References Cited

U.S. PATENT DOCUMENTS

| | | | |
|---|---|---|---|
| 2012/0042185 A1* | 2/2012 | Lee | G06F 1/266 |
| | | | 713/323 |
| 2013/0124897 A1* | 5/2013 | Jeon | G06F 1/3209 |
| | | | 713/324 |
| 2013/0275793 A1 | 10/2013 | Yagi | |
| 2014/0139868 A1 | 5/2014 | Yoshioka | |
| 2015/0058642 A1* | 2/2015 | Okamoto | G06F 13/14 |
| | | | 713/300 |
| 2015/0253842 A1* | 9/2015 | Murata | G06F 1/3287 |
| | | | 713/323 |

FOREIGN PATENT DOCUMENTS

| | | |
|---|---|---|
| JP | 3570968 | 7/2004 |
| JP | 4388876 | 10/2009 |
| JP | 2010-004260 | 1/2010 |
| JP | 4983033 | 5/2012 |
| JP | 2013-216061 | 10/2013 |
| JP | 2014-102605 | 6/2014 |
| JP | 2014-164625 | 9/2014 |

* cited by examiner

DEVICE, OPERATION-MODE CONTROL METHOD, AND RECORDING MEDIUM

CROSS-REFERENCE TO RELATED APPLICATIONS

The present application claims priority under 35 U.S.C. § 119 to Japanese Patent Application No. 2015-215682, filed Nov. 2, 2015 and Japanese Patent Application No. 2016-178582, filed Sep. 13, 2016. The contents of which are incorporated herein by reference in their entirety.

BACKGROUND OF THE INVENTION

1. Field of the Invention

The present invention relates to a device, an operation-mode control method, and a recording medium.

2. Description of the Related Art

The number types of devices connected to a network and and the number of such devices have increased, and is believed to increase in the future but be unlikely to decrease. Devices, which are connected to a network, consume the electric power even though users do not operate the decices; therefore, there is demand for reduction in the power consumption. For such demand, the EU imposes the requirement for making design (Ecodesign) in consideration of the environment to facilitate energy saving, and this regulation is called Erp directive.

The Erp directive Lot 6 (revised in 2013) defines that, with regard to devices manufactured after 2017, the devices should automatically transition to the off mode (also called the shutdown mode) if the wired network is shut down and all the wireless network ports are terminated. The off mode is the operation mode where there is a physical connection with the commercial power source while the power source of the entire device is turned off. That is, if a communication is disabled wirelessly or with a wired line, the device transitions to the off mode so that the power consumption is reduced.

According to the above directive, devices that include a network port and that have a remote restart function are within the application range. Therefore, multifunction peripherals or single-function printers, which have been exempt from the regulation, are also subjected to the regulation. If a device simply transitions to the off mode, a user needs to restart the device when the user desires to use the device while the device is in the off mode (usually presses the main power switch).

Furthermore, according to the above-described directive, devices are required to automatically transition to the off mode even if the LAN cable is unintentionally removed. The transition to the off mode in a case where the LAN cable is unintentionally removed is not the state transition in accordance with the user's intension. Therefore, there is a possibility that the user does not notice that the device is in the off mode (thinks that the device is in the energy-saving mode or a more active operation mode) although the LAN cable is connected, and users try to print out with the device. In this case, after the main power switch is pressed by the user, it takes a long time to enable operations, which may result in a degradation of usability.

Thus, a technique for making a multifunction peripheral, which has transitioned to the off mode, transition to the standby mode in response to a user's print request is devised (for example, see Japanese Unexamined Patent Application Publication No. 2014-164625).

However, according to the technique disclosed in Japanese Unexamined Patent Application Publication No. 2014-164625, it is assumed that a phone line is connected to a device as the host computer performs state transition control using the phone line; therefore, there is a problem in that the technique is not usable in devices that are not compatible with phone lines or in the environment where there is no phone line.

SUMMARY OF THE INVENTION

A device has a plurality of power states. The device includes a communication processor, a confirmation-signal receiver, a controller, and a power circuit. The communication processor is configured to communicate with a communication destination device connected via a cable. The confirmation-signal receiver is configured to receive a connection confirmation signal that is transmitted if being connected to the communication destination device via the cable. The contoller is configured to determine a power state depending on whether the confirmation-signal receiver receives the connection confirmation signal. The power circuit is configured to control supply of electric power to at least one of the communication processor and the contoller in accordance with the power state determined by the contoller.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
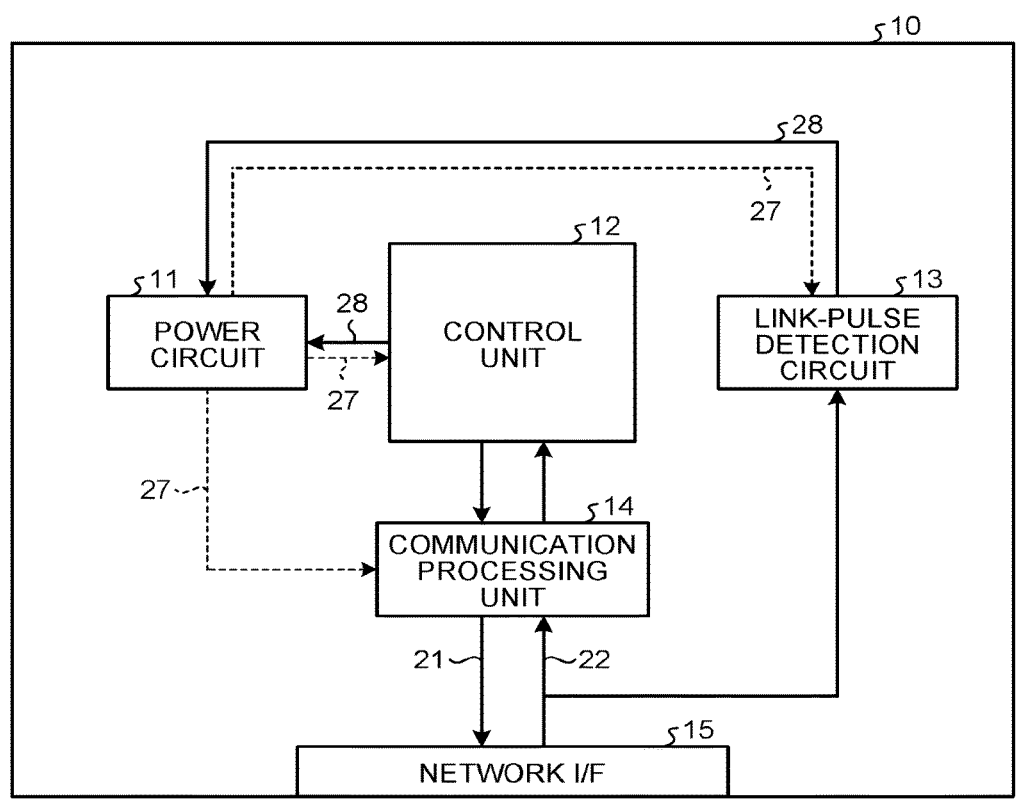
FIG. 1 is an example of the schematic configuration diagram of a network device.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the drawings, an explanation is given below of a network device and an operation-mode control method implemented by the network device as an example of the embodiment for implementing the present invention.

An embodiment has an object to provide a device that is unlikely to degrade usability even if a transition is made to the off mode due to disconnection of a wired network.

First Example

If the network device according to the present example shifts to the off mode due to network shutdown, the network device detects link pulses, transmitted through the wired network, and returns to the power state that is a higher level than the off mode. The link pulses mean pulse signals transmitted on a regular basis while a communication destination device does not transmit data. Principally, the link pulses are used as a test of whether the LAN cable is connected to a network device. Therefore, if the wired network is connected, link pulses are detected so that the energy-saving state may be reset. Furthermore, if the wired network is connected, although there is no state transition control by the user, the low-power mode, or the like, may be automatically reset. Thus, although there occurs wired network shutdown, which is not intended by the user, if the wired network is connected, the waiting time for printing in response to a user's print request may be shortened.

Furthermore, if "wired network shutdown" is mentioned below, it is assumed that all the ports are shut down with regard to the wireless network or no wireless network devices are inherently included, and the wireless network is not mentioned in every case.

Furthermore, "the off mode" is the operation mode (the shut-down state) during which the power source of the entire device is shut down while there is a physical connection with the commercial power source. That is, in the off mode, the shutdown has been performed but there is a physical connection with the commercial power source, and the power plug of the network device is connected to the outlet of the commercial power source.

In the off mode, no electric power is supplied to the physical layer of the wired network function; therefore, it is difficult to change the operation mode from the off mode by detecting wired network connection. In other words, if wired network connection is to be detected to make a transition from the off mode to a standby mode SM, there is a need to supply the electric power to the physical layer, and it is difficult to reduce the power consumption. According to the present example, no electric power is supplied to the physical layer in the off mode so that the power consumption may be reduced.

With Regard to Terms

The communication destination device is a device as a communication destination with which the network device communicates via the wired network. The communication destination device may be any device that communicates with the network device according to the present example. For example, examples of the communication destination device may include, in addition to the network device according to the present example, a hub, an L2 switch, an L3 switch, a router, or the like.

Connection confirmation signals are the signals that are transmitted even if there is no data to be transmitted when a connection is established with the communication destination device via the wired network. Alternatively, the connection confirmation signals are the signals for enabling detection that the network device is connected to the wired network. Alternatively, the connection confirmation signals may be signals with which the communication destination device confirms the presence of the network device. In the present example, an explanation is given using the term of link pulse. It does not mater what the signals are called as long as the signals have the function equivalent to the link pulses.

The start-up request signal refers to a signal for requesting the network device to start up. More specifically, the start-up request signa is the signal for making the transition from the power state where the start-up request signal is receivable to the power state where the user is capable of using the network device. In the present example, an explanation is given using the term of the magic packet.

Configuration Example

FIG. 1 is an example of the schematic configuration diagram of a network device 10. The network device 10 includes a control unit 12, a power circuit 11, a link-pulse detection circuit 13, a network I/F 15, and a communication processing unit 14. In FIG. 1, the dotted line indicates an electric-power supply line 27, and the solid line indicates a control signal line 28.

Here, the network device 10 may be any device that is connectable to the network. For example, the network device 10 may be, but is not limited to, a device called an image forming device, multifunction peripheral, multi-functional printer (MFP), printer, scanner, facsimile machine, copier, duplicator, information processing device, projector, electronic blackboard, teleconference terminal, digital signage, digital camera, or car navigation device.

The network I/F 15 is a physical socket into which a cable is inserted. For example, the network I/F 15 has a shape for connecting a LAN cable that conforms to Ethernet (registered trademark).

The communication processing unit 14 performs control related to the physical layer of the network. The physical layer refers to a layer that is the lowermost layer of the OSI reference model. The physical layer defines physical/material systems with regard to network connection or data transmission, such as a data expression method on the network or the interface configuration. Specifically, the shape of the interface of a connector, the material, the voltage level used for conversion of electric signals, and/or the timing for changing the voltage level of a network, and/or the like are defined.

Furthermore, the communication processing unit 14 has part of the function of the data link layer of the OSI reference model. That is, the communication processing unit 14 has the function to transmit and receive data stored in a frame. Furthermore, the communication processing unit 14 has the function to detect data collision and retransmit the data, and/or the like. Furthermore, the communication processing unit 14 may be incorporated in the control unit 12. Moreover, the communication processing unit 14 is sometimes referred to as a network interface card (NIC) or an Ethernet (registered trademark) card.

The power circuit 11 controls the power state in accordance with the operation mode that is determined by the control unit 12, or the like. Specifically, the power circuit 11 turns on or off the power supply to the control unit 12, the power circuit 11, the link-pulse detection circuit 13, the network I/F 15, and the communication processing unit 14 in accordance with the operation mode.

The control unit 12 connects to the network via the communication processing unit 14 and the network I/F 15, thereby communicating with an information processing device, such as the different network device 10 or a personal computer (PC). Generally, the network I/F 15 is connected to a LAN cable. The control unit 12 is an information processing device that performs overall control of the network device 10, and includes typical components such as a CPU, a RAM, a ROM, and a flash memory.

If a LAN cable is connected to the network I/F 15, a link pulse (a change in the voltage from Low to High) is input to a reception signal line 22 of the network I/F 15 from the network on a regular basis. If no LAN cable is connected, no link pulse is input.

The link-pulse detection circuit 13 is a circuit that detects the link pulses. The link-pulse detection circuit 13 detects link pulses even if the electric power is not supplied to the communication processing unit 14, and controls the power circuit 11 so as to make the network device 10 transition to a predetermined power state. Thus, the network device 10 may transition to the power-saving mode, the standby mode, or the like, even if the network device 10 has transitioned to the off mode while the network device 10 is not connected to the LAN cable. The link-pulse detection circuit 13 is an information processing device, such as a microcomputer, and includes typical components such as a CPU, a RAM, a ROM, and a flash memory.

As illustrated in FIG. 1, the reception signal line 22 of the network I/F 15 branches to the link-pulse detection circuit 13 and, if a link pulse is transmitted, the link-pulse detection circuit 13 detects a change (from Low to High, from High to Low) in the voltage of the reception signal line 22, thereby detecting, sensing, or determining the connection to the network.

State Transition

Figure 2:
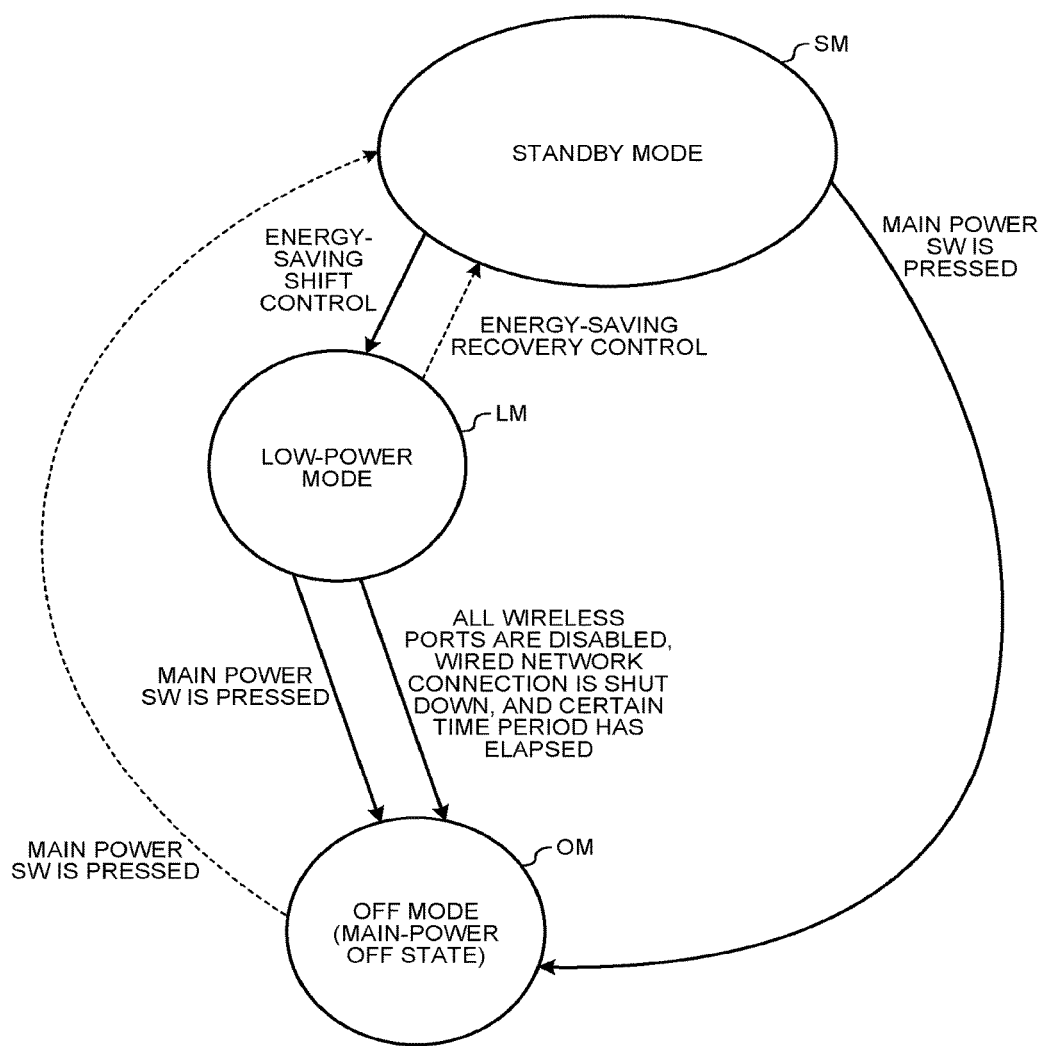
FIG. 2 is an example of the comparative example of the state transition diagram.
Figure 3:
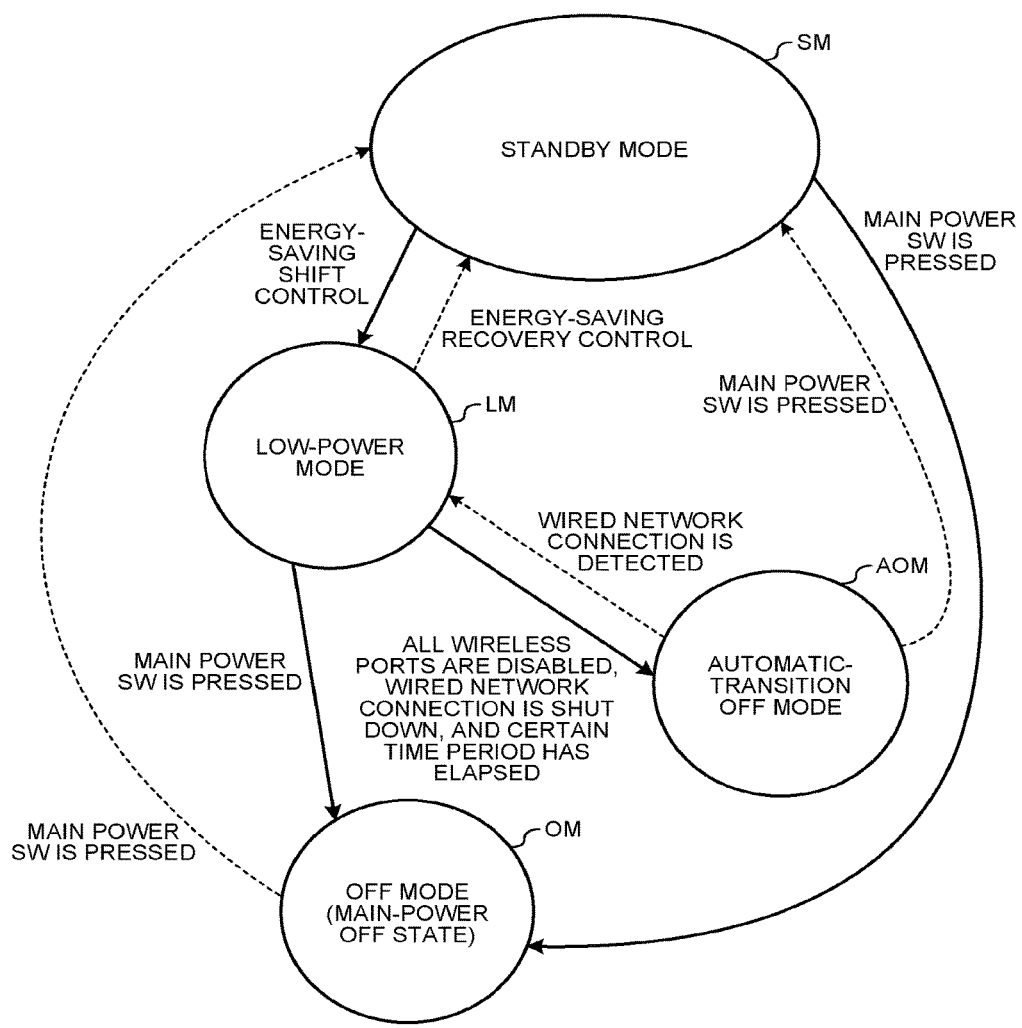
FIG. 3 is an example of the state transition diagram.

Next, with reference to FIGS. 2 and 3, the state transition of the network device 10 is explained. First, FIG. 2 is a comparative example of the state transition diagram. As illustrated in FIG. 2, the network device 10 has multiple operation modes (power states). In FIG. 2, for example, various operation modes of the standby mode SM, a low-power mode LM, and an off mode OM are provided. The operation mode refers to the power state of the network device 10 with a different power consumption state. If the power state is determined, the operation mode is also determined. Furthermore, the operation modes of the network device 10 are given for explanation, and operation modes other than the operation modes illustrated in FIG. 2 are often provided.

The standby mode SM is the power state where operations are instantaneously possible without any recovery time. From the standby mode SM, a transition to the state (also referred to as the normal operation mode, the active mode, or the like) where all the functions may be instantaneously used is possible, so that users hardly feel the waiting time.

An energy-saving mode is the operation mode where the network device 10 is connected to the main power source and only one or more than one of the following restart functions may be provided. The first is the function to transition to the standby mode SM using a remote switch, an internal sensor, or a timer. The second is the function to store information, such as the time, or display the state.

The off mode OM is the operation mode where the power source of the entire device is turned off while there is a physical connection with the commercial power source. It is possible to respond to user's operations on the hardware keys provided on the network device 10 (may respond to the software keys of the touch panel). In other words, the off mode OM is the state where, in despite of the shutdown, there is a physical connection with the commercial power source. A state is such that the power plug is connected to the outlet of the commercial power source.

A transition from the standby mode SM to the low-power mode LM is made if there are no user's operations for more than a predetermined time period (energy-saving shift control). Instead of no operations, there is also a case where a shift is made if an energy-saving button is pressed. A transition from the low-power mode LM to the standby mode SM is made due to detection of the start of use using a remote switch or an internal sensor, time-out using a timer, or the like (energy-saving recovery control). A transition from the standby mode SM to the off mode OM is made if the main power switch is pressed. A transition from the off mode OM to the standby mode SM is made if the main power switch is pressed.

A transition from the low-power mode LM to the off mode OM is made if the main power switch is pressed, or if the wired network connection is shut down, all the wireless ports are disabled, and a certain time period has elapsed.

FIG. 3 illustrates an example of the state transition diagram according to the present example. In FIG. 3, an automatic-transition off mode AOM is added. A transition from the low-power mode LM to the automatic-transition off mode AOM is made if automatic transition conditions (all the wireless ports are disabled, the wired network connection is shut down, and a certain time period has elapsed), defined by Erp directive Lot 6, are satisfied. Contrary to the off mode OM, a transition from the automatic-transition off mode AOM to the low-power mode LM is made if wired network connection is detected. Furthermore, if the main power switch is pressed, a transition from the automatic-transition off mode AOM to the standby mode is made.

Power State in Each Operation Mode

Figure 4:
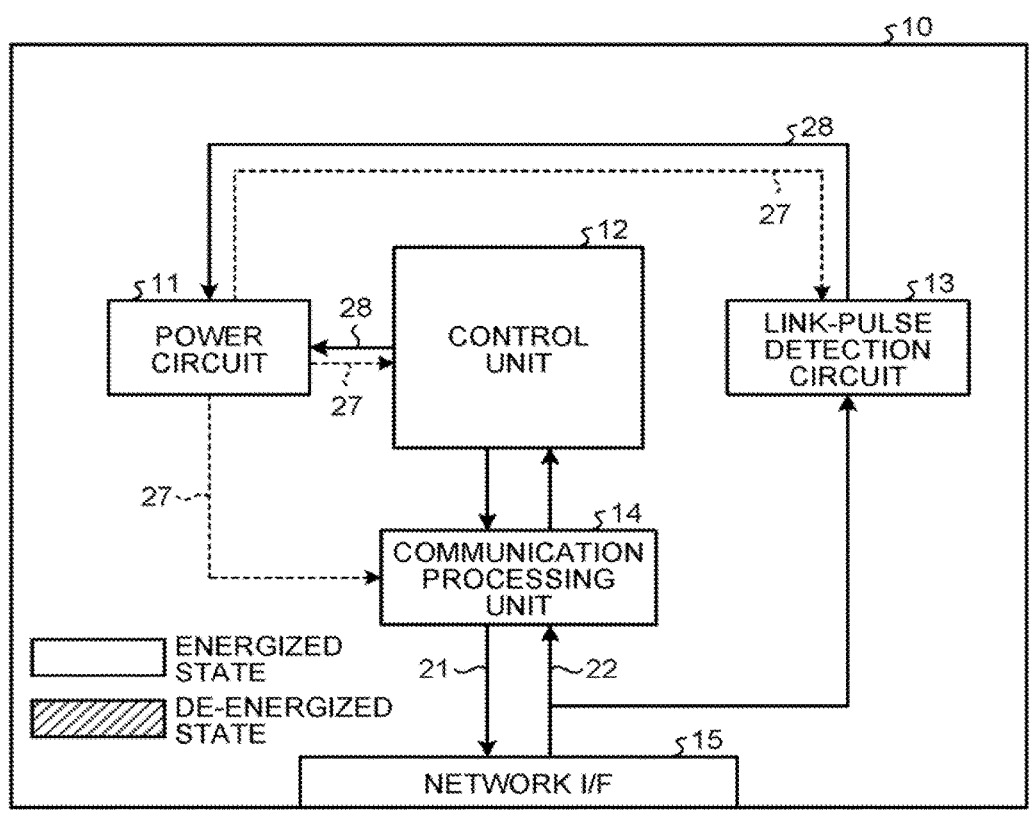
FIG. 4 is an example of the diagram that illustrates the power states in a standby mode and a low-power mode.
Figure 5:
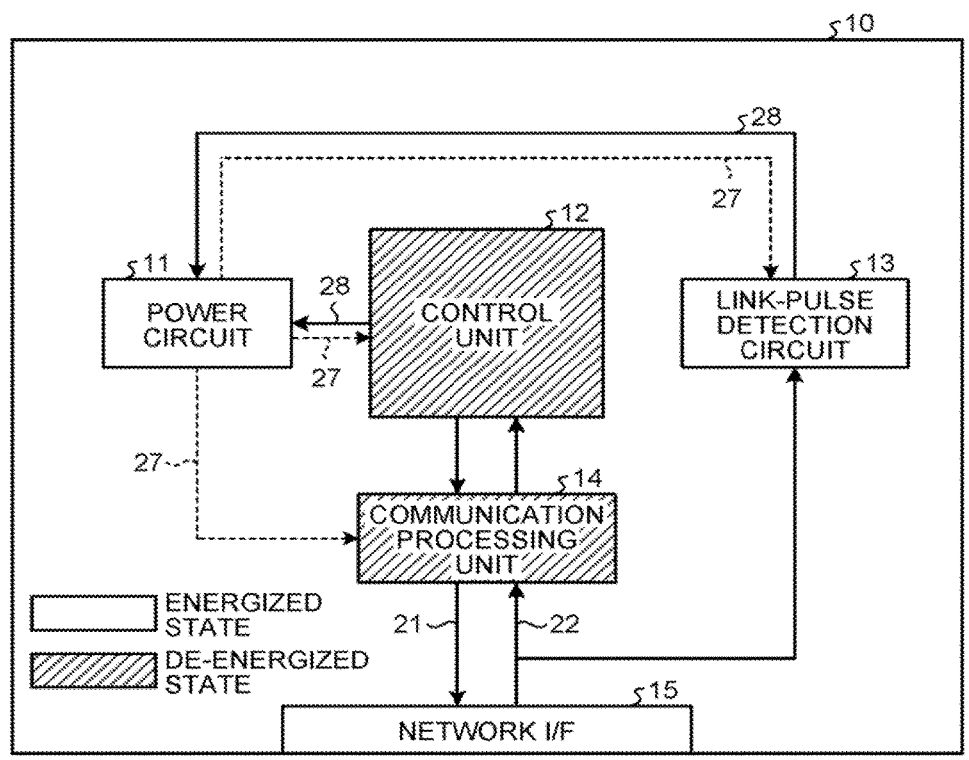
FIG. 5 is an example of the diagram that illustrates the power state in an automatic-transition off mode.
Figure 6:
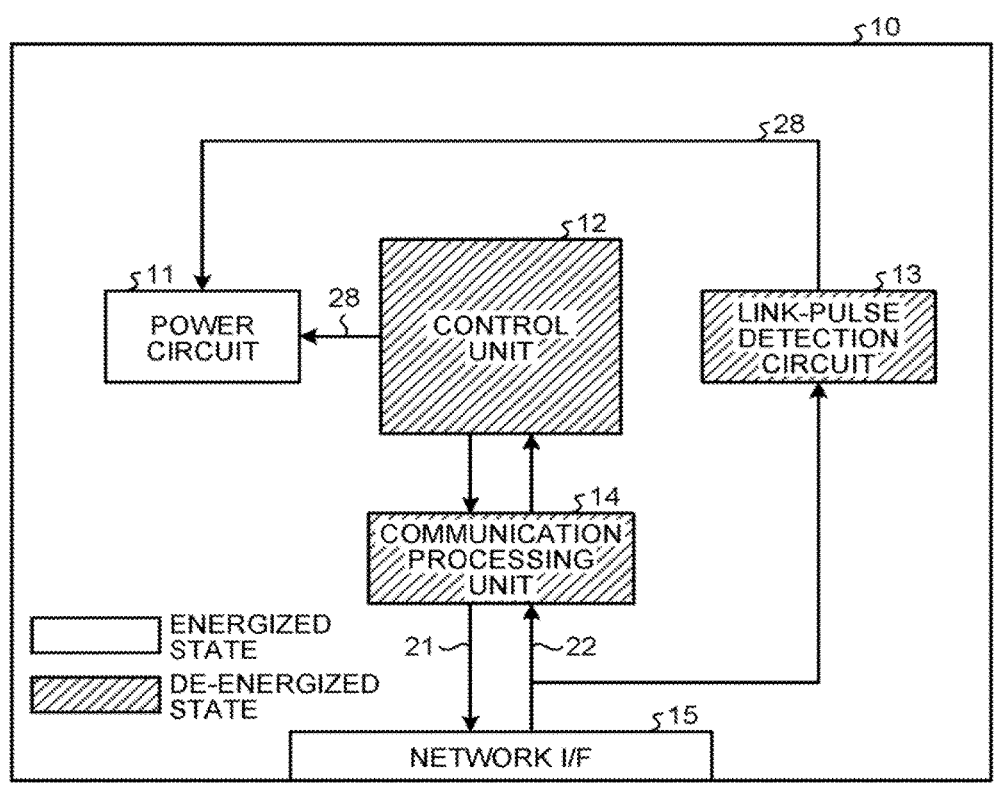
FIG. 6 is an example of the diagram that illustrates the power state in an off mode.

FIG. 4 is an example of the diagram that illustrates the power states in the standby mode SM and the low-power mode LM. In FIGS. 4 to 6, the block (hardware component) attached with diagonal lines means a de-energized state (no electric power supply), and the block without any diagonal lines means an energized state.

As illustrated in FIG. 4, in the standby mode SM and the low-power mode LM, the power circuit 11 supplies the electric power to the control unit 12, the communication processing unit 14, and the link-pulse detection circuit 13. The standby mode SM and the low-power mode LM are not different in the power state; however, in actuality, during the low-power mode LM, the electric power is supplied to only some of the functions of the control unit 12, or operation clocks are reduced, whereby a state is obtained such that the power consumption is reduced compared to the standby mode SM.

FIG. 5 is an example of a diagram that illustrates the power state in the automatic-transition off mode AOM. As illustrated in FIG. 5, during the automatic-transition off mode AOM, the control unit 12 and the communication processing unit 14 are not supplied with electric power from the power circuit 11 and are in a de-energized state. Here, the power circuit 11 supplies the electric power to the link-pulse detection circuit 13.

FIG. 6 is an example of the diagram that illustrates the power state in the off mode OM. As illustrated in FIG. 6, during the off mode OM, the power circuit 11 does not supply the electric power to the control unit 12, the communication processing unit 14, and the link-pulse detection circuit 13 are not supplied with electric power from the power circuit 11 and are in a de-energized state.

As understood from the comparison between FIGS. 5 and 6, during the off mode OM, even if the LAN cable is connected to the network I/F 15, the link-pulse detection circuit 13 may not detect link pulses. Conversely, with the provision of the link-pulse detection circuit 13 and the automatic-transition off mode AOM, if the LAN cable is connected to the network I/F 15, the link-pulse detection circuit 13 may detect link pulses and control the power circuit 11 so as to transition to the low-power mode LM.

With Regard to Function

Figure 7:
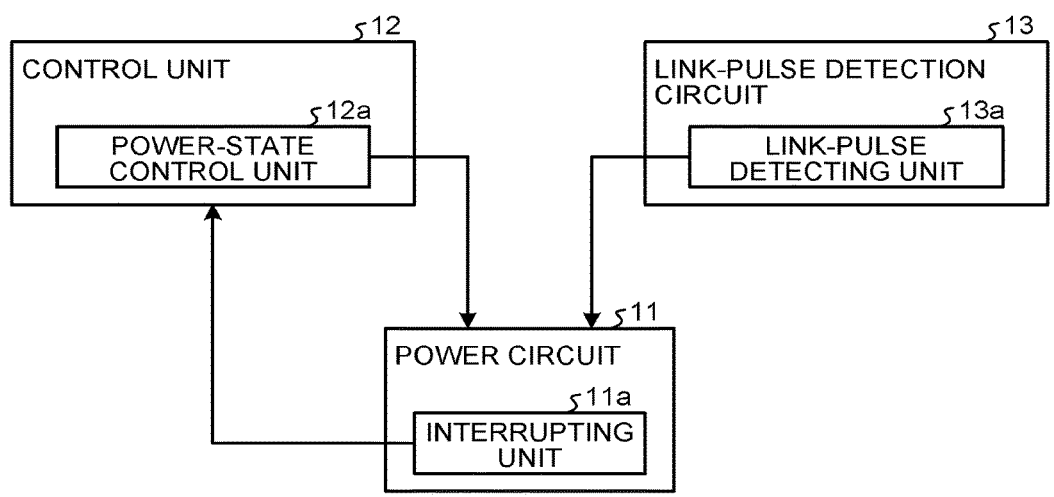
FIG. 7 is an example of the functional block diagram that illustrates the function related to the state transition of the network device.

FIG. 7 is an example of the functional block diagram that illustrates the function related to the state transition of the network device 10 according to the present example.

First, the control unit 12 includes a power-state control unit 12a that is implemented when the CPU executes a program, or the like. The power-state control unit 12a controls the power circuit 11 to control the operation mode of the network device 10 if the control unit 12 is in an energized state.

The link-pulse detection circuit 13 includes a link-pulse detecting unit 13a that is implemented when the CPU executes a program, or the like. The link-pulse detecting unit 13a detects link pulses if the link-pulse detection circuit 13 is in an energized state, and controls the power circuit 11 so as to transition to the energy-saving state.

Furthermore, the power circuit 11 includes an interrupting unit 11a. During the off mode OM, as the control unit 12 and the link-pulse detection circuit 13 are in a de-energized state, it is difficult for the control unit 12 and the link-pulse detection circuit 13 to return to an energized state. Therefore, the interrupting unit 11a of the power circuit 11 makes the control unit 12 transition to an energized state upon detection of pressing of the main power switch. The control unit 12 starts the network device 10 due to typical start-up processing so as to return to the standby mode SM.

Steps of Operation

Figure 8:
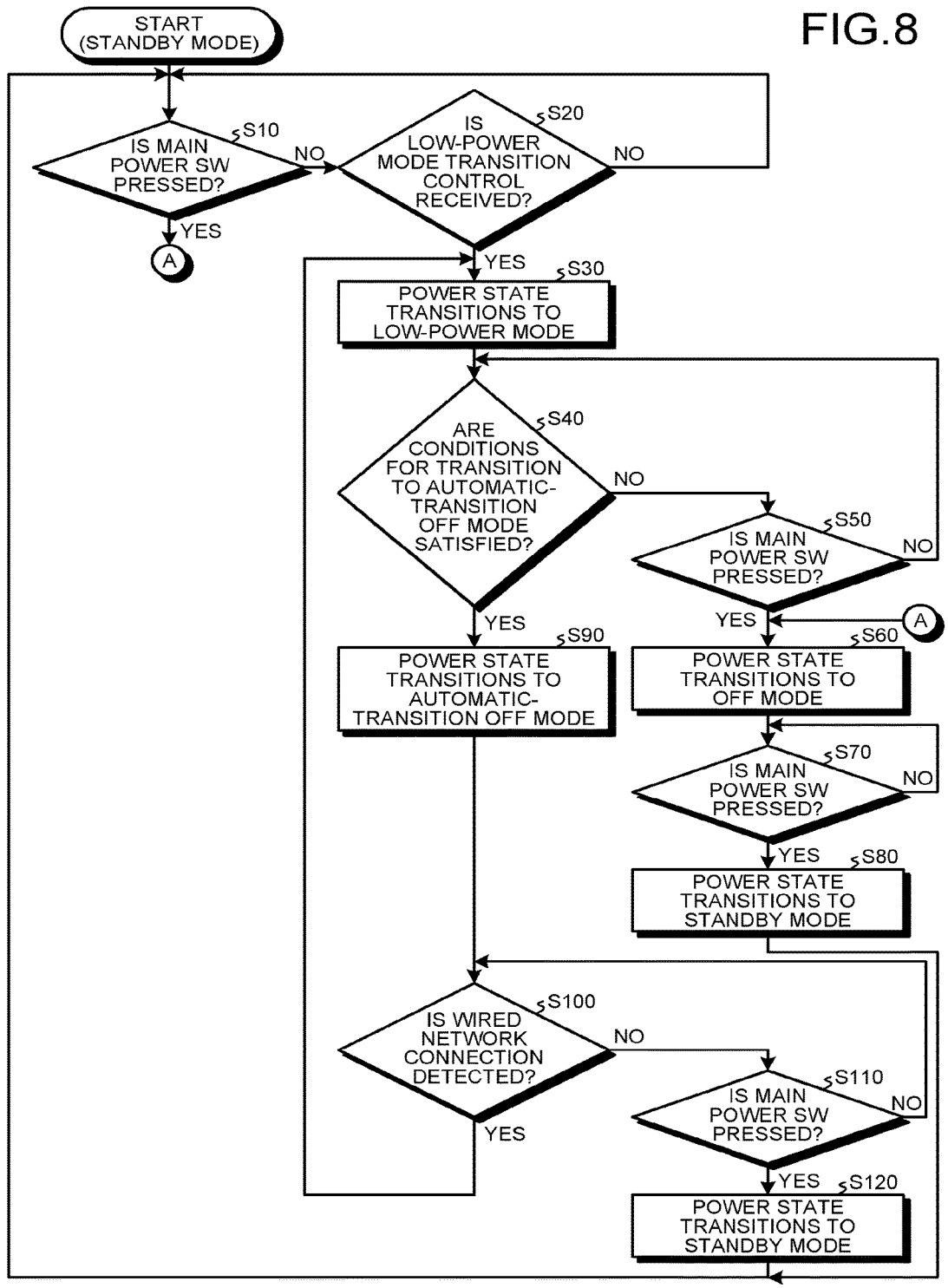
FIG. 8 is an example of the flowchart that illustrates the steps at which the power state transitions in the network device.

FIG. 8 is an example of the flowchart that illustrates the steps at which the power state transitions in the network device 10 according to the present example. The process in FIG. 8 starts in the state where the network device 10 is in the standby mode SM.

If the main power switch is pressed in the standby mode SM (Yes at S10), the power-state control unit 12a makes the power state transition to the off mode (S60).

If the main power switch is not pressed in the standby mode SM (No at S10), the power-state control unit 12a determines whether low-power mode transition control is received (S20). The low-power mode transition control refers to reception of time-out from the timer, which measures non-operation time (including a print request, or the like, via the network) of the network device 10.

If a determination at Step S20 is No, the process returns to Step S10.

If a determination at Step S20 is Yes, the power-state control unit 12a controls the power circuit 11 so as to make the power state transition to the low-power mode LM (S30). Specifically, the power circuit 11 stops the electric power to some of the functions of the control unit 12, or operation clocks are reduced.

Next, the power-state control unit 12a determines whether the conditions for transition to the automatic-transition off mode AOM are satisfied (S40). The conditions for transition to the automatic-transition off mode AOM are that the wired network connection is shut down, all the wireless ports are disabled, and a certain time period has elapsed, as described above.

If a determination at Step S40 is No, the power-state control unit 12a determines whether the main power switch is pressed (S50). If a determination at Step S50 is No, the process returns to Step S40.

If a determination at Step S50 is Yes, the power-state control unit 12a makes the power state transition to the off mode OM (S60). That is, the power circuit 11 is controlled so as to make the control unit 12, the communication processing unit 14, and the link-pulse detection circuit 13 enter a de-energized state.

Next, the interrupting unit 11a of the power circuit 11 determines whether the main power switch is pressed (S70). As the control unit 12 is in a de-energized state, the interrupting unit 11a detects a change in the voltage from Low to High when, for example, the main power switch is pressed, thereby determining whether the main power switch is pressed. If the main power switch is not pressed (No at S70), the interrupting unit 11a continuously stands by in the off mode.

If the main power switch is pressed (Yes at S70), the network device 10 transitions to the standby mode SM (S80). For example, the interrupting unit 11a starts to supply the electric power to the control unit 12. Thus, the control unit 12 starts up to enter an energized state, and the power-state control unit 12a controls the power circuit 11 so as to make the communication processing unit 14 and the link-pulse detection circuit 13 enter an energized state. As a transition is made to the standby mode SM, the process returns to Step S10.

If a determination at Step S40 is Yes, the power-state control unit 12a makes the power state transition to the automatic-transition off mode AOM (S90). That is, the power-state control unit 12a controls the power circuit 11 so as to make the control unit 12 and the communication processing unit 14 transition to a de-energized state.

Then, the link-pulse detecting unit 13a determines whether the wired network is connected depending on whether a link pulse has been detected (S100). The wired network is for example a LAN cable.

If a determination at Step S100 is No, the interrupting unit 11a of the power circuit 11 determines whether the main power switch is pressed (S110). If a determination at Step S110 is No, the automatic-transition off mode AOM is continuously set and therefore the process returns to Step S100.

If a determination at Step S100 is Yes, the link-pulse detecting unit 13a of the link-pulse detection circuit 13 controls the power circuit 11 so as to transition to the low-power mode (S30). Specifically, the power circuit 11 starts to supply the electric power to the control unit 12. Thus, the control unit 12 starts up to enter an energized state, and the power-state control unit 12a controls the power circuit 11 so as to make the communication processing unit 14 enter an energized state.

If a determination at Step S110 is Yes, the network device 10 transitions to the standby mode SM (S120). For example, the interrupting unit 11a starts to supply the electric power to the control unit 12. Thus, the control unit 12 starts up to enter an energized state, and the power-state control unit 12a controls the power circuit 11 so as to make the communication processing unit 14 enter an energized state. As a transition is made to the standby mode SM, the process returns to Step S10.

As described above, as the network device 10 according to the present example is provided with the automatic-transition off mode AOM where the link-pulse detection circuit 13 is in an energized state, the network device 10 can detect link pulses transmitted through the wired network and transition to the low-power mode LM. Therefore, even if the wired network is unintentionally disconnected, the low-power mode may be reset when the wired network is connected again. During the low-power mode LM, the electric power is supplied to the control unit 12; therefore, it is possible to shorten the waiting time before printing in response to a user's print request.

Second Example

In the present example, an explanation is given of the state transition of the network device 10 that further includes a bus switch 16. It is known that, if the reception signal line 22 branches from the network I/F 15 to the link-pulse detection circuit 13 as described in the first example, the waveform of signals are distorted due to reflected waves. As the bus switch 16 disconnects the network I/F 15 and the link-pulse detection circuit 13 during other than the automatic-transition off mode AOM, degradation of waveforms may be prevented.

Figure 9:
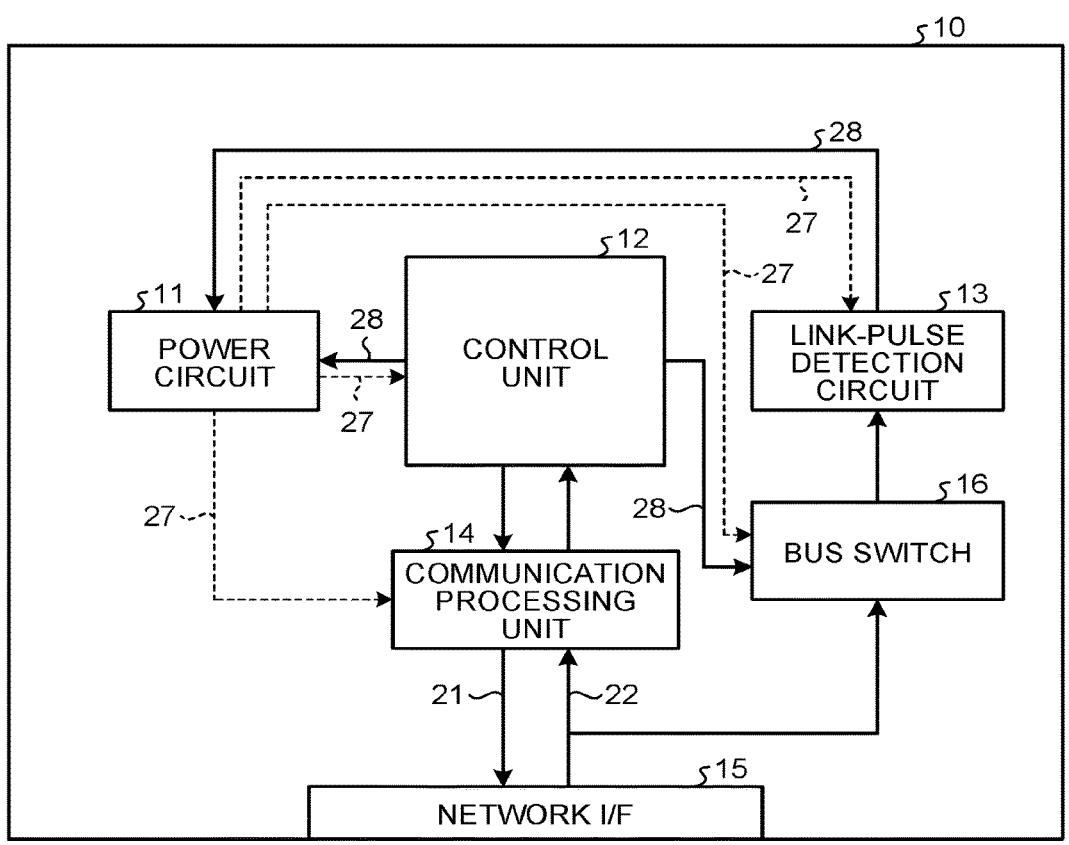
FIG. 9 is an example of the schematic configuration diagram of the network device (a second example)

FIG. 9 is an example of the schematic configuration diagram of the network device 10 (the second example). In this specification, as the components attached with the same reference numeral have the same functionality, explanations for the component, which has been explained once, are omitted or only the differences are explained in some cases. The same holds in the following example.

In FIG. 9, the bus switch 16 is provided between the network I/F 15 and the link-pulse detection circuit 13. The bus switch 16 is controlled by the control unit 12, and switches between a connected state and a disconnected state with regard to the connection between the network I/F 15 and the link-pulse detection circuit 13. The control unit 12 controls the bus switch 16 so as to enter a connected state when a transition is made to the automatic-transition off mode AOM and controls the bus switch 16 so as to enter a disconnected state during the other operation modes.

Figure 10:
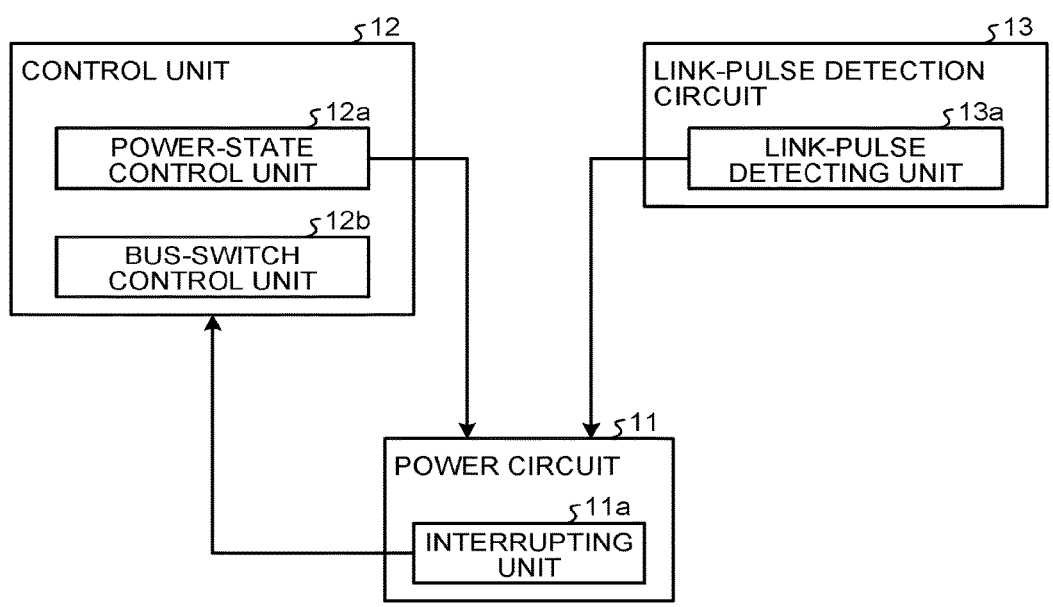
FIG. 10 is an example of the functional block diagram that illustrates the function related to the state transition of the network device (the second example)

FIG. 10 is an example of the functional block diagram that illustrates the function related to the state transition of the network device 10 according to the present example (the second example). In FIG. 10, the control unit 12 includes a bus-switch control unit 12b. The bus-switch control unit 12b controls the bus switch 16 so as to enter a disconnected state or a connected state.

Figure 11:
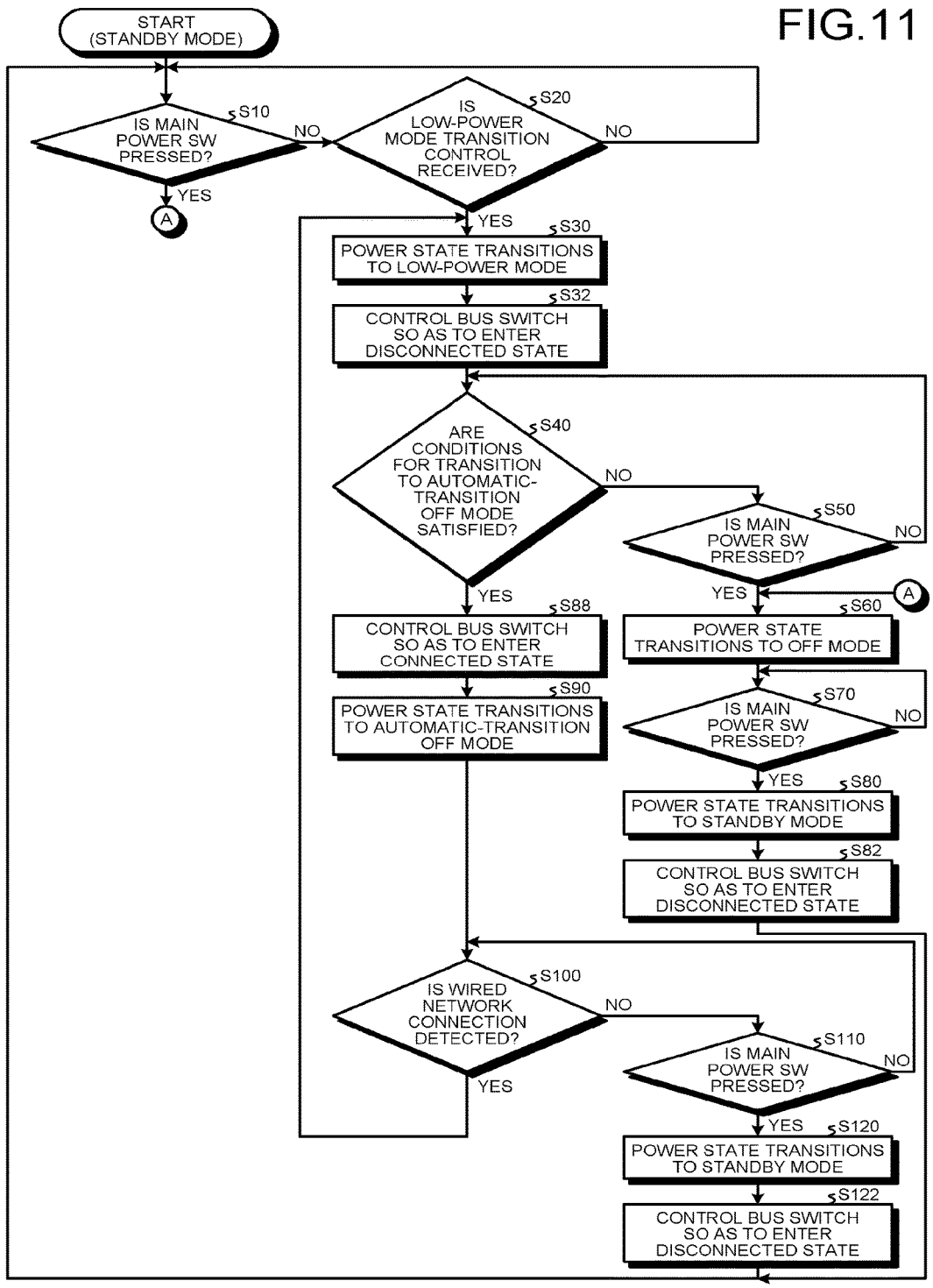
FIG. 11 is an example of the flowchart that illustrates the steps at which the power state transitions in the network device (the second example)

FIG. 11 is an example of the flowchart that illustrates the steps at which the power state transitions in the network device 10 according to the present example. In explanations of FIG. 11, the differences from FIG. 8 are principally explained.

First, after Steps S80 and S120 where a transition is made to the standby mode SM, the bus-switch control unit 12b of the control unit 12 controls the bus switch 16 so as to enter a disconnected state (S82, S122).

Furthermore, after Step S30 where a transition is made to the low-power mode LM, the bus-switch control unit 12b controls the bus switch 16 so as to enter a disconnected state (S32). Afterward, the bus switch 16 may be in a disconnected state until a transition is made to the automatic-transition off mode AOM. Thus, it is possible to prevent degradation of signals due to reflection.

Furthermore, before Step S90 where a transition is made to the automatic-transition off mode AOM, the bus-switch control unit 12b of the control unit 12 controls the bus switch 16 so as to enter a connected state (S88). Thus, during the automatic-transition off mode AOM, the link-pulse detection circuit 13 is capable of detecting link pulses.

Third Example

In the present example, an explanation is given of the network device 10 with which users are capable of specifying settings as to whether the automatic-transition off mode AOM is enabled. As there are users who do not want a transition to the standby mode SM to be made due to wired network connection, the users may make a selection as to whether a transition is to be made to the standby mode SM due to wired network connection.

Figure 12:
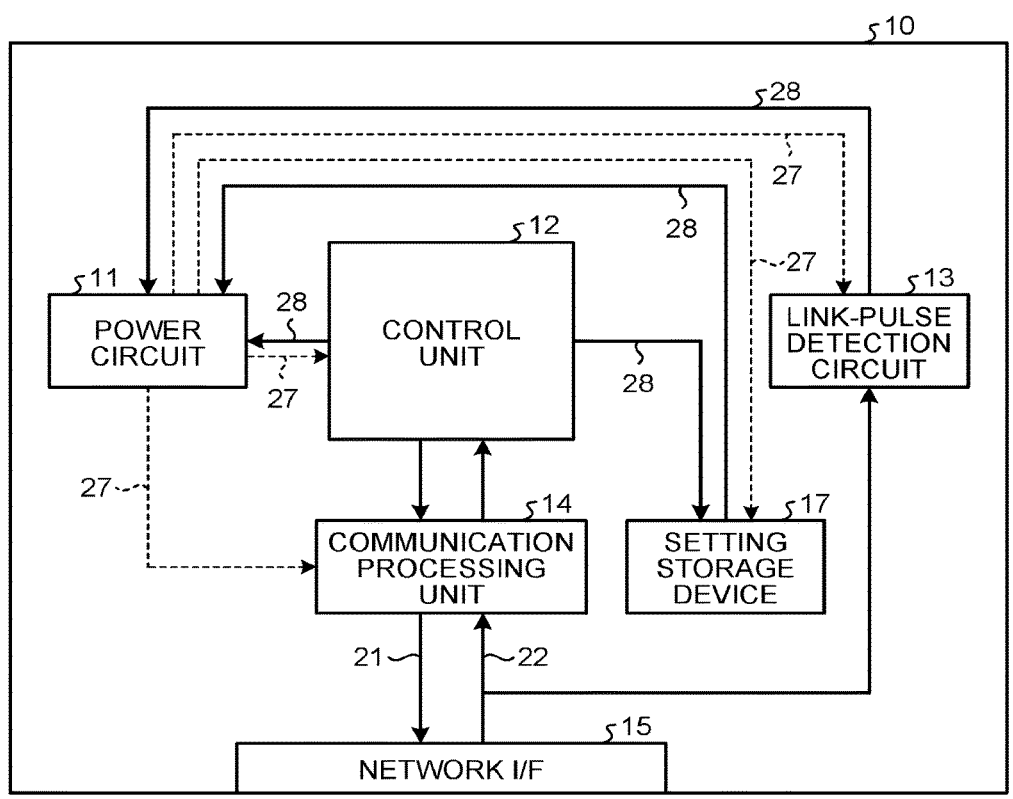
FIG. 12 is an example of the schematic configuration diagram of the network device (a third example)

FIG. 12 is an example of the schematic configuration diagram of the network device 10 (the third example). In FIG. 12, the network device 10 includes a setting storage device 17. The setting storage device 17 is an information processing device, such as a microcomputer. The setting storage device 17 is connected to the control unit 12 and the power circuit 11 via the control signal line 28. Furthermore, the setting storage device 17 is connected to the power circuit 11 via the electric-power supply line 27.

If the user makes the setting that a transition to the automatic-transition off mode AOM is on or off during the standby mode SM, or the like, the control unit 12 notifies the setting to the setting storage device 17. The setting storage device 17 stores the setting information in the memory. On the basis of the setting information stored in the memory, the setting storage device 17 determines whether supply of the electric power to the link-pulse detection circuit 13 is enabled or disabled, and controls the power circuit 11. Here, the setting storage device 17 is in an energized state even in the automatic-transition off mode AOM. As the power consumption of the setting storage device 17 is extremely smaller than of the control unit 12, the power consumption may be reduced compared to the case where the control unit 12 stores the setting information.

Figure 13:
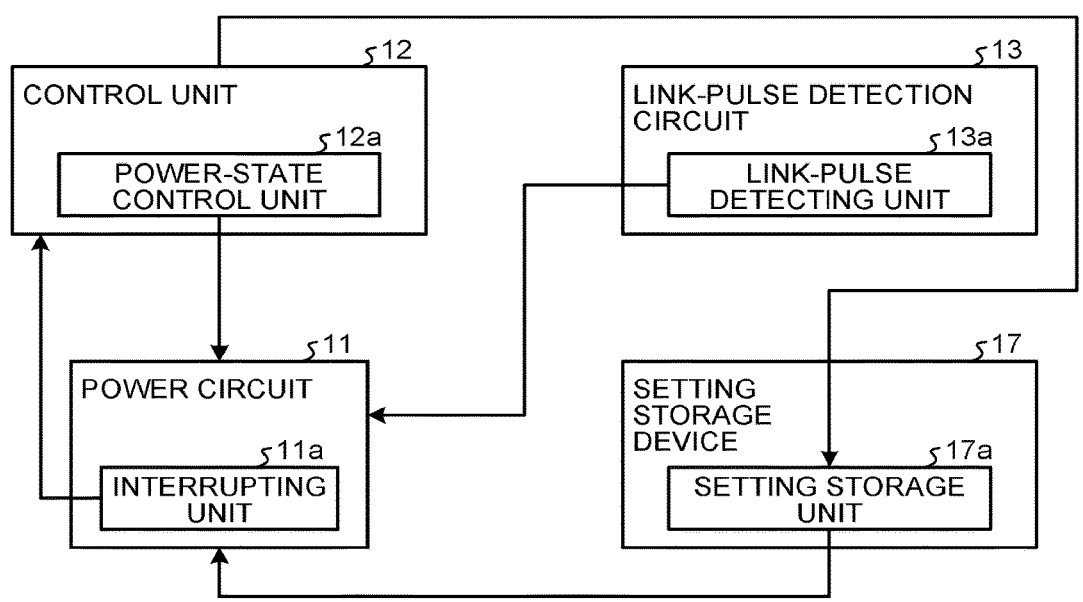
FIG. 13 is an example of the functional block diagram that illustrates the function related to the state transition of the network device (the third example)

FIG. 13 is an example of the functional block diagram that illustrates the function related to the state transition of the network device 10 according to the present example (the third example). In FIG. 13, the network device 10 includes the setting storage device 17, and the setting storage device 17 includes a setting storage unit 17a. The setting storage unit 17a stores the setting information as to whether a transition is to be made to the automatic-transition off mode AOM. Specifically, the setting information is stored in a nonvolatile or volatile memory.

Figure 14:
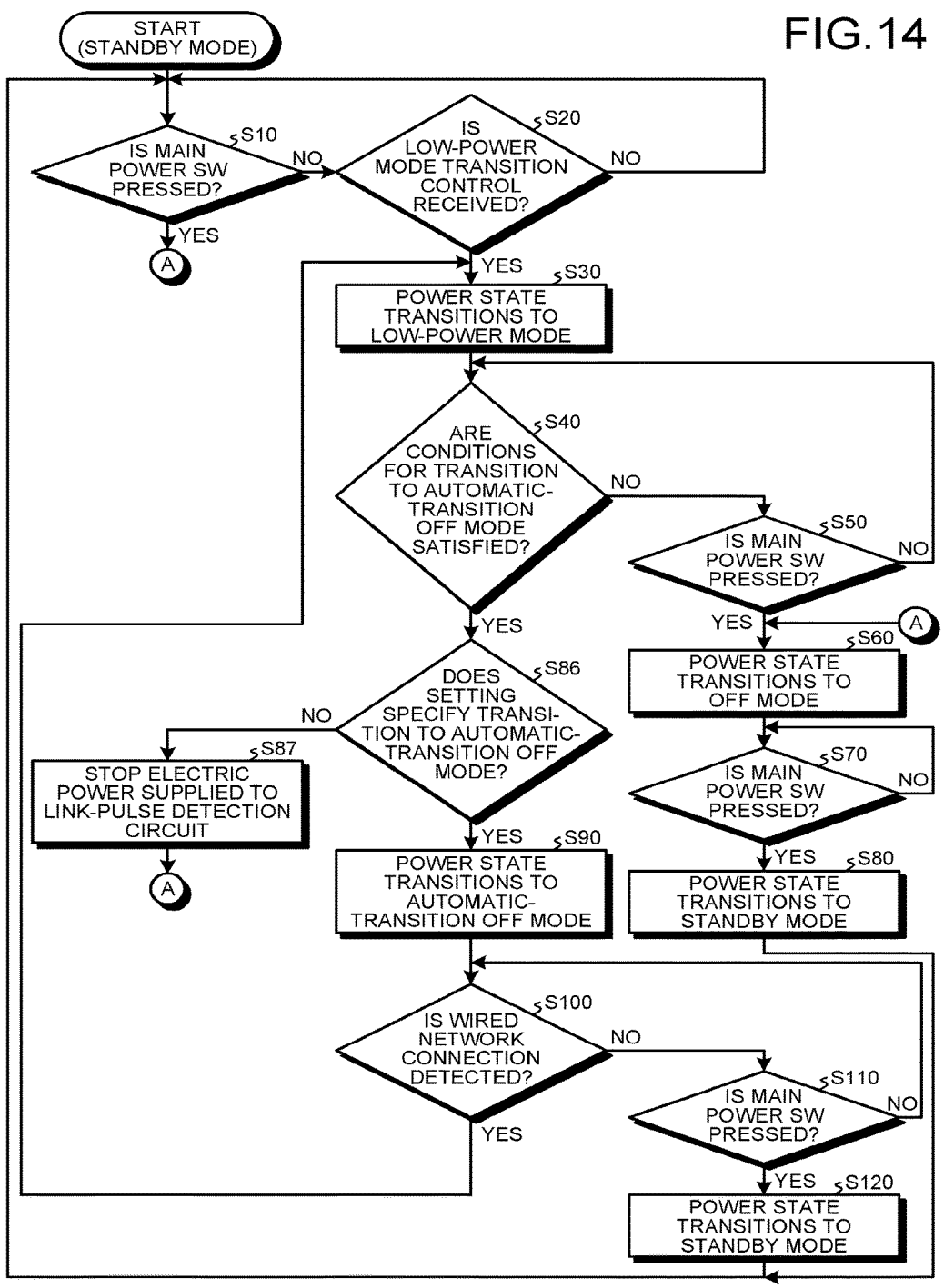
FIG. 14 is an example of the flowchart that illustrates the steps at which the power state transitions in the network device (the third example)

FIG. 14 is an example of the flowchart that illustrates the steps at which the power state transitions in the network device 10 according to the present example. In explanations of FIG. 14, the differences from FIG. 8 are principally explained.

Although the control unit 12 performs control so as to transition to the automatic-transition off mode AOM at Step S50, the setting storage unit 17a always controls the power circuit 11 in accordance with the setting information. Alternatively, when the control unit 12 makes a transition to the automatic-transition off mode AOM, the control unit 12 makes the transition to the automatic-transition off mode AOM is detected, and the power circuit 11 is controlled. Specifically, if the setting information does not specify a transition to the automatic-transition off mode AOM (No at S86), the setting storage unit 17a controls the power circuit 11 so as to stop the electric power supplied to the link-pulse detection circuit 13 (S87). Thus, the power circuit 11 controls the link-pulse detection circuit 13 so as to enter a de-energized state, whereby the same power state as in the off mode OM is obtained. Afterward, the process proceeds to Step S60.

If the setting information specifies a transition to the automatic-transition off mode AOM (Yes at S86), the setting storage unit 17a does not control the power circuit 11 so that the link-pulse detection circuit 13 is in an energized state, and the process proceeds to Step S90.

As described above, with the provision of the setting storage device 17, the power consumption may be reduced, and users are capable of specifying the setting as to whether a transition is to be made to the automatic-transition off mode AOM.

Fourth Example

In the present example, an explanation is given of the network device 10 in which the link-pulse detection circuit 13 has the function to count pulses. Thus, it is possible to prevent transition from the automatic-transition off mode AOM to the low-power mode LM due to noise.

Figure 15:
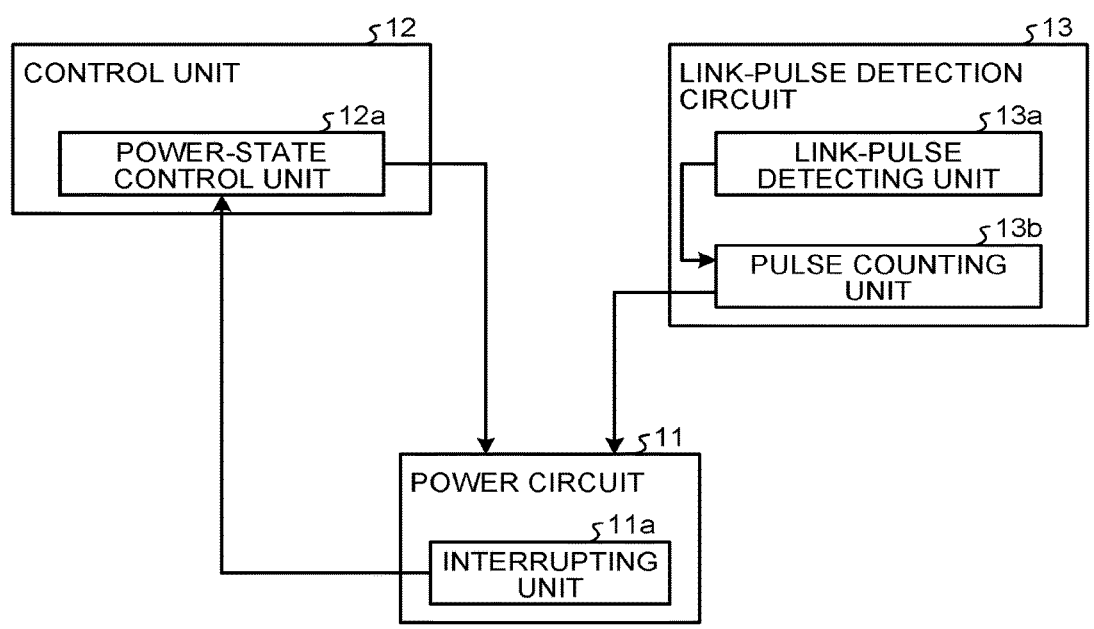
FIG. 15 is an example of the functional block diagram that illustrates the function related to the state transition of the network device (a fourth example)

FIG. 15 is an example of the functional block diagram that illustrates the function related to the state transition of the network device 10 according to the present example (the fourth example). In FIG. 15, the link-pulse detection circuit 13 includes a pulse counting unit 13b. The pulse counting unit 13b counts the number of times of changes (from Low to High, from High to Low, or both from Low to High and from High to Low) in the voltage of the reception signal line 22, detected by the link-pulse detecting unit 13a. Then, if changes in the voltage (the number of pulses), which are equal to or more than a predetermined number, are counted, the power circuit 11 is controlled so that a transition is made to the low-power mode LM.

Figure 16:
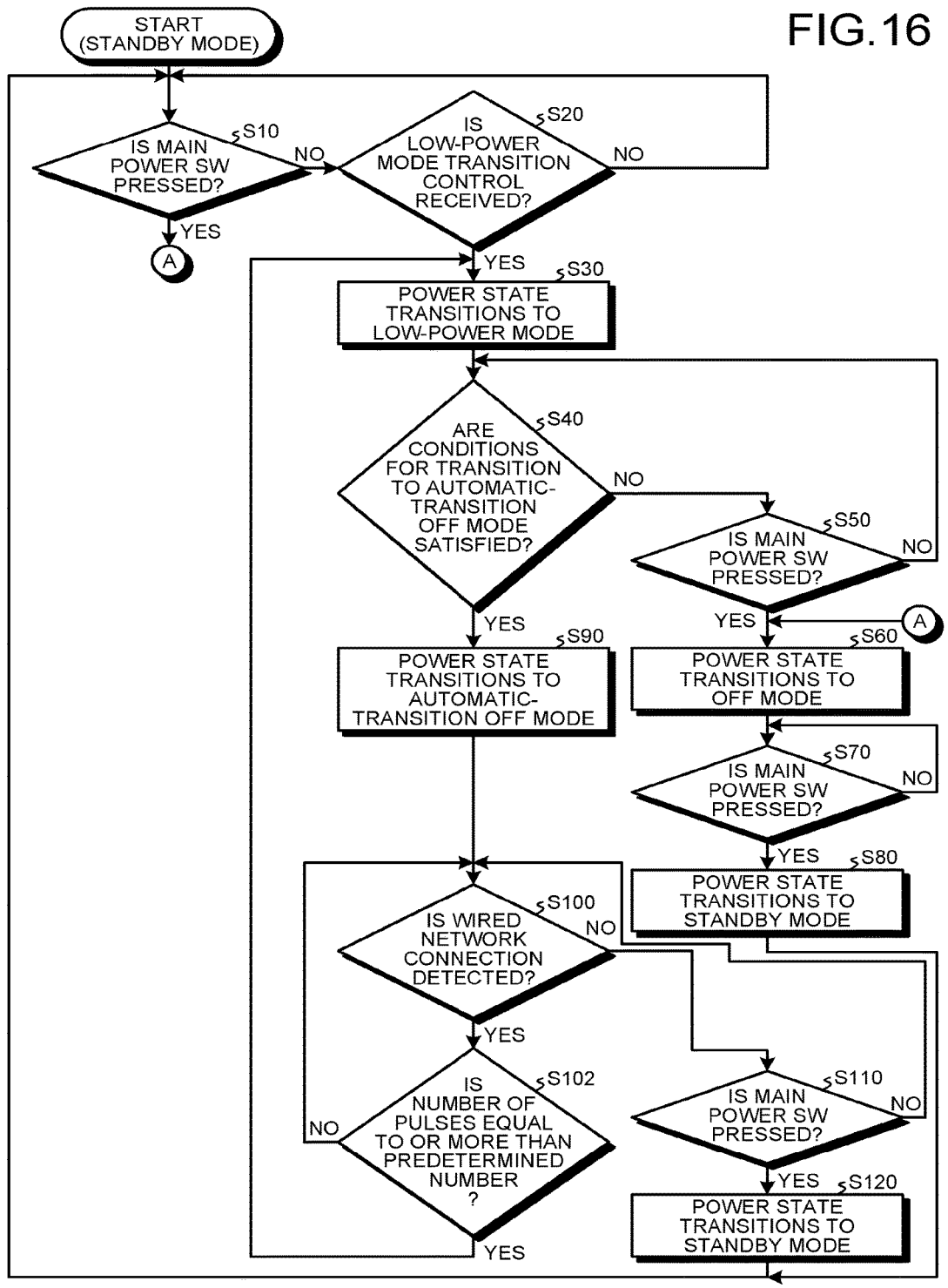
FIG. 16 is an example of the flowchart that illustrates the steps at which the power state transitions in the network device (a fourth example)

FIG. 16 is an example of the flowchart that illustrates the steps at which the power state transitions in the network device 10 according to the present example. In explanations of FIG. 16, the differences from FIG. 8 are principally explained.

If a wired network connection is detected at Step S100 (Yes at S100), the pulse counting unit 13b determines whether the number of pulses is equal to or more than a predetermined number (S102). That is, the number of pulses in a unit of time is compared with the predetermined number. If a determination at Step S102 is Yes, the change in the voltage may be determined to be a link pulse rather than noise, and therefore the pulse counting unit 13b controls the power circuit 11 so as to transition to the low-power mode LM.

If a determination at Step S102 is No, the process returns to Step S100. Therefore, if a change in the voltage is caused by noise, a transition to the low-power mode LM may be prevented.

Fifth Example

In the present example, an explanation is given of the network device 10 that is capable of returning to the state before power shutdown if unintentional power shutdown, such as power outage, occurs and a recovery is made from the unintentional power shutdown. Therefore, in a state where the wired network is not connected, if the automatic-transition off mode AOM is set before the power outage, the automatic-transition off mode AOM may be reset after recovery of the power supply and, if the off mode OM is set before the power outage, the off mode OM may be reset.

Figure 17:
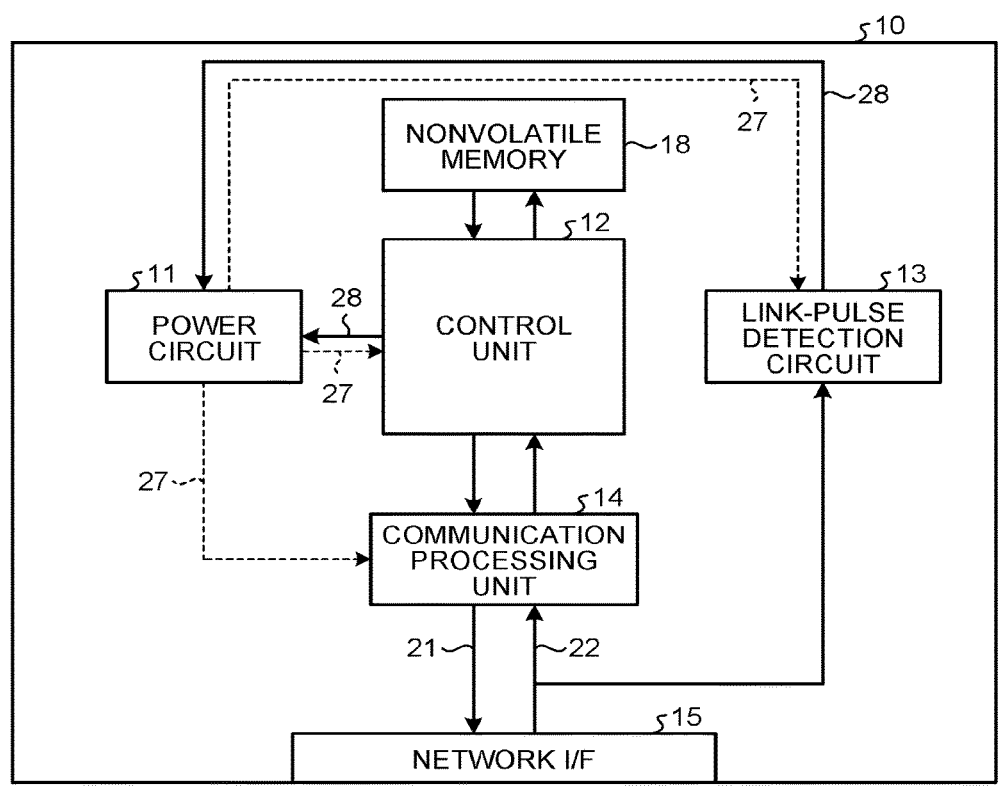
FIG. 17 is an example of the functional block diagram that illustrates the function related to the state transition of the network device (a fifth example)

FIG. 17 is an example of the functional block diagram that illustrates the function related to the state transition of the network device 10 according to the present example (the fifth example). In FIG. 17, the control unit 12 is connected to a nonvolatile memory 18. The nonvolatile memory 18 stores memory contents even if the control unit 12 is in a de-energized state.

The present example uses two flags, i.e., a flag 1 for detecting an abnormal termination and a flag 2 for detecting whether the automatic-transition off mode AOM is set in the state before the abnormal termination. The flag 1 is set to be ON (1) at the time of start-up, and is cleared to be OFF (0) during the process for a transition to the off-mode. Therefore, if the power source is turned off in the sequence during other than the process for a transition to the off-mode, ON (1) is retained, and an abnormal termination may be detected next time the network device 10 checks the flag 1 at the time of start-up.

In a case where a transition is made to the automatic-transition off mode AOM, if the transition is made when the wired network connection is shut down, all the wireless ports are disabled, and a certain time period has elapsed, the power-state control unit 12a of the control unit 12 ssts the flag 2 in the nonvolatile memory 18. Furthermore, the flag 2 is cleared during other operation modes.

If power outage occurs during the automatic-transition off mode AOM, the flag 2 is set in the nonvolatile memory 18, and if power outage occurs during other operation modes, the flag 2 is not set in the nonvolatile memory 18. Therefore, when the power supply is recovered, the power-state control unit 12a performs control so as to set the automatic-transition off mode AOM if the flag 2 is set, and does not make a transition to the automatic-transition off mode AOM if the flag 2 is not set (makes a transition to the off mode).

With the above-described control, if power outage occurs and then the power source is recovered while the wired network is unintentionally disconnected by a user, a transition may be made to the automatic-transition off mode AOM again. Conversely, if the main power source is turned off by a user, a transition may be made to the off mode OM again due to recovery of the power source.

Figure 18A:
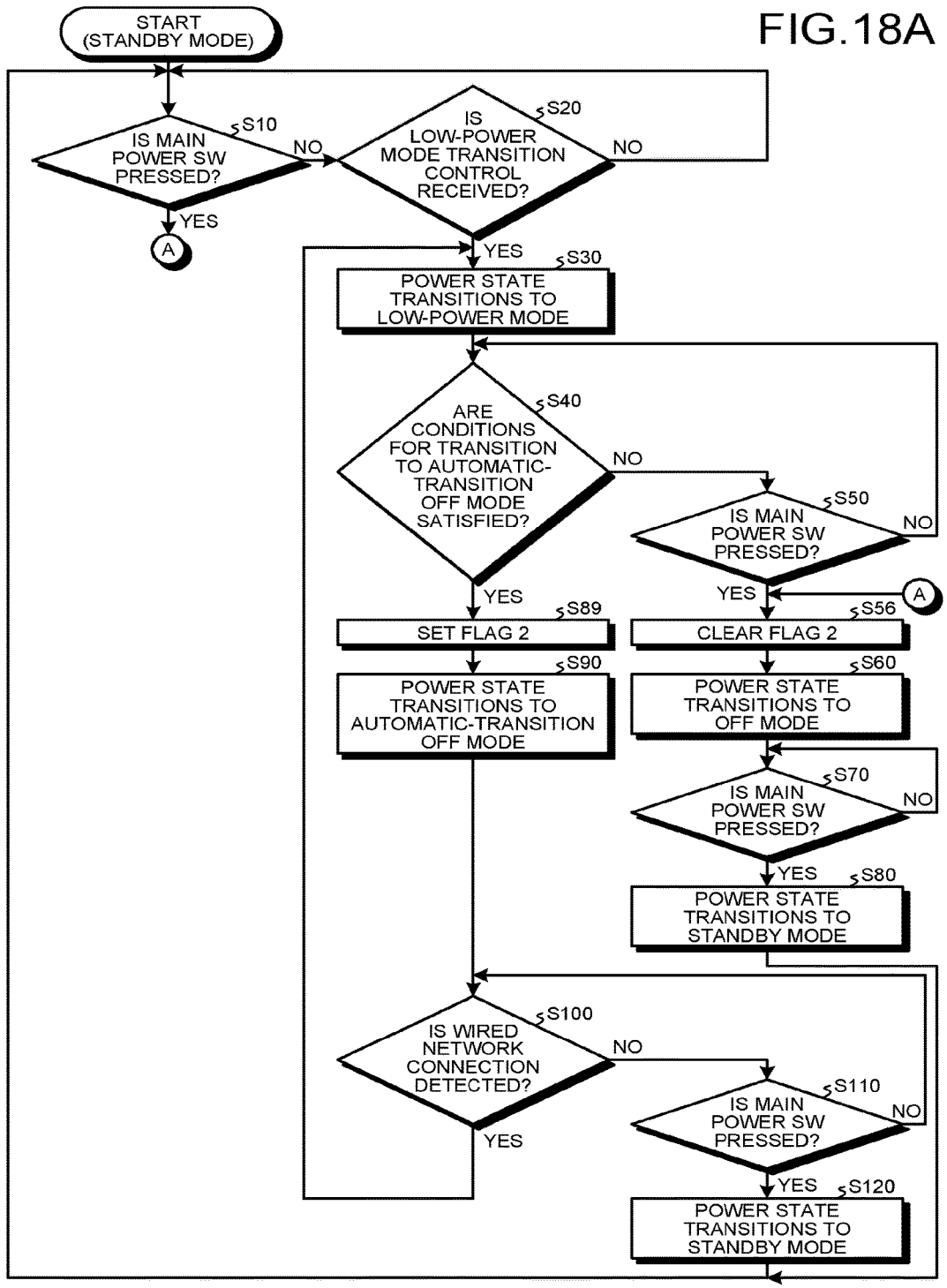
FIG. 18A is an example of the flowchart that illustrates the steps at which the power state transitions in the network device (the fifth example)

FIG. 18A is an example of the flowchart that illustrates the steps at which the power state transitions in the network device 10 according to the present example.

In explanations of FIG. 18A, the differences from FIG. 8 are principally explained. If it is determined at Step S40 that the conditions for transition to the automatic-transition off mode AOM are satisfied, the power-state control unit 12a sets the flag 2 in the nonvolatile memory (S89).

Then, the power-state control unit 12a makes a transition to the automatic-transition off mode AOM (S90). Therefore, if the automatic-transition off mode AOM is set before recovery from the power outage, a transition may be made to the automatic-transition off mode AOM.

Furthermore, before a transition is made to the off mode OM at Step S60, the power-state control unit 12a clears the flag 2 in the nonvolatile memory 18 (S56). Thus, if power outage occurs during the off mode OM and then a recovery is made, a transition may be made to the off mode OM as the flag 2 is not set.

Figure 18B:
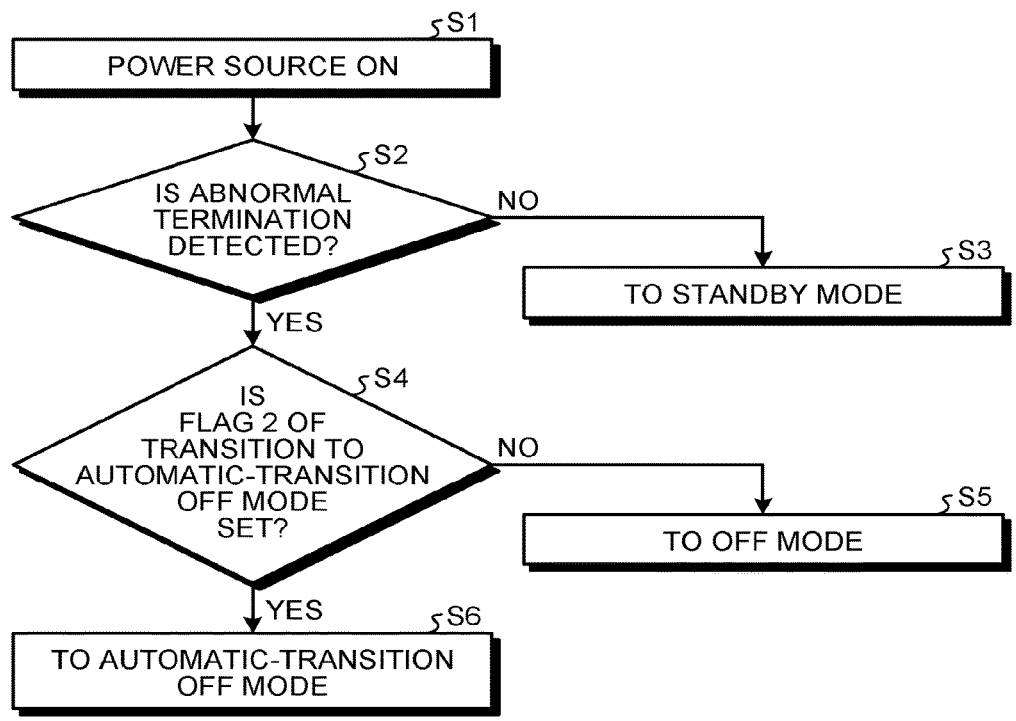
FIG. 18B is an example of the flowchart that illustrates the steps at which the power state transitions in the network device (the fifth example)

FIG. 18B is an example of the diagram that illustrates the operation mode that is determined depending on whether there is an abnormal termination. First, the power source of the network device 10 is turned on (S1).

Next, the flag 1 is reffered to determine whether there is abnormal termination detection (S2). If there is no abnormal termination detection, the network device 10 starts up in the standby mode (S3).

If there is abnormal termination detection, the network device 10 determines whether flag 2 that indicates that a transition is made to the automatic-transition off mode is set (S4).

If the flag 2 is not set, the network device 10 makes a transition to the off mode (S5).

If the flag 2 is set, the network device 10 makes a transition to the automatic-transition off mode (S6).

As described above, in a state where the wired network is not connected, if the automatic-transition off mode AOM is set before power outage, the automatic-transition off mode AOM may be reset after recovery of the power source and, if the off mode OM is set before power outage, the off mode OM may be reset.

Sixth Example

In the present example, an explanation is given of the network device 10 in which a transmission signal line 21 is connected to the link-pulse detection circuit 13. If a cross LAN cable is connected, Tx/Rx connection is opposite to a straight LAN cable; however, even in such a case, the functions according to the first example to the fifth example may be effective.

Figure 19:
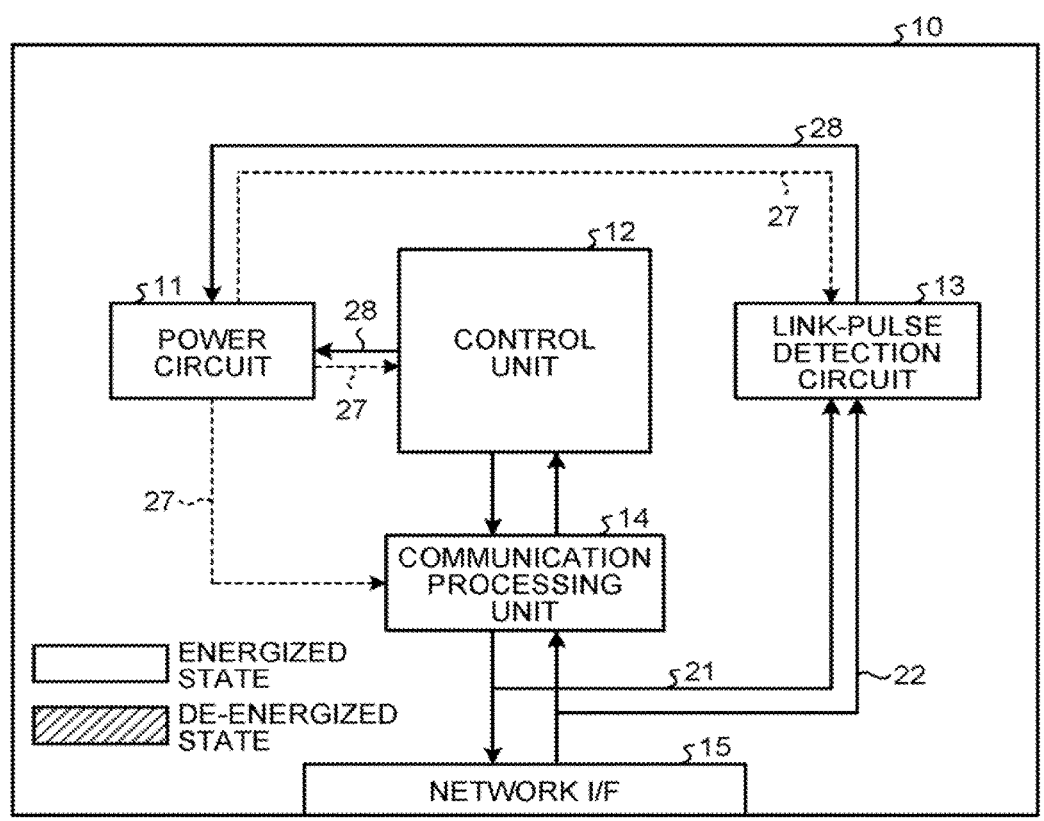
FIG. 19 is an example of the schematic configuration diagram of the network device (a sixth example)

FIG. 19 is an example of the schematic configuration diagram of the network device 10 (the sixth example). In the network device 10 of FIG. 19, not only the reception signal line 22 but also the transmission signal line 21 branches to the link-pulse detection circuit 13.

A straight cable receives a signal from the communication destination device at the first and the second pins that are the terminals at both ends, and transmits a signal to the communication destination device at the third and the sixth pins. According to the first example to the fifth example, including the present example, the reception signal line 22 corresponds to the first and the second pins, and the transmission signal line 21 corresponds to the third and the sixth pins. A cross cable receives a signal from the communication destination device at the third and the sixth pins, and transmits a signal to the communication destination device at the first and the second pins. Therefore, if a cross cable is connected to the network I/F 15, link pulses are transmitted to the transmission signal line 21.

According to the present example, the transmission signal line 21 also branches to the link-pulse detection circuit 13; therefore, even if a cross cable is connected to the network I/F 15, the link-pulse detection circuit 13 may detect link pulses.

Seventh Example

The communication processing unit 14 sometimes have Wake On LAN (hereafter, referred to as WOL) function. The WOL function is the function to change the power state if a specific packet (a broadcast frame of Ethernet (registered trademark) that is the layer 2) called a magic packet is detected. As magic packets are detected by the communication processing unit 14, it is difficult to detect magic packets while the communication processing unit 14 is in an energized state.

The WOL is the system where the communication destination device transmits a specific packet to the network device 10 so that the network device 10, designated by the packet, turns on the power source. The magic packet is the data pattern that includes 16 MAC addresses of the device that needs to be started, followed by FF:FF:FF:FF:FF:FF. However, the present example is not limited to the magic packet, any packet that is transmitted for the WOL is applicable.

During the automatic-transition off mode AOM according to the first example to the sixth example, the communication processing unit 14 is in a de-energized state; therefore, it is difficult to detect magic packets. According to the present example, the power state called a WOL-compatible off mode WOM is provided as the off mode that is compatible with the WOL function. Thus, if a magic packet is received during the WOL-compatible off mode WOM, the communication processing unit 14 controls the power circuit 11 so as to make the control unit 12 transition to an energized state.

Figure 20:
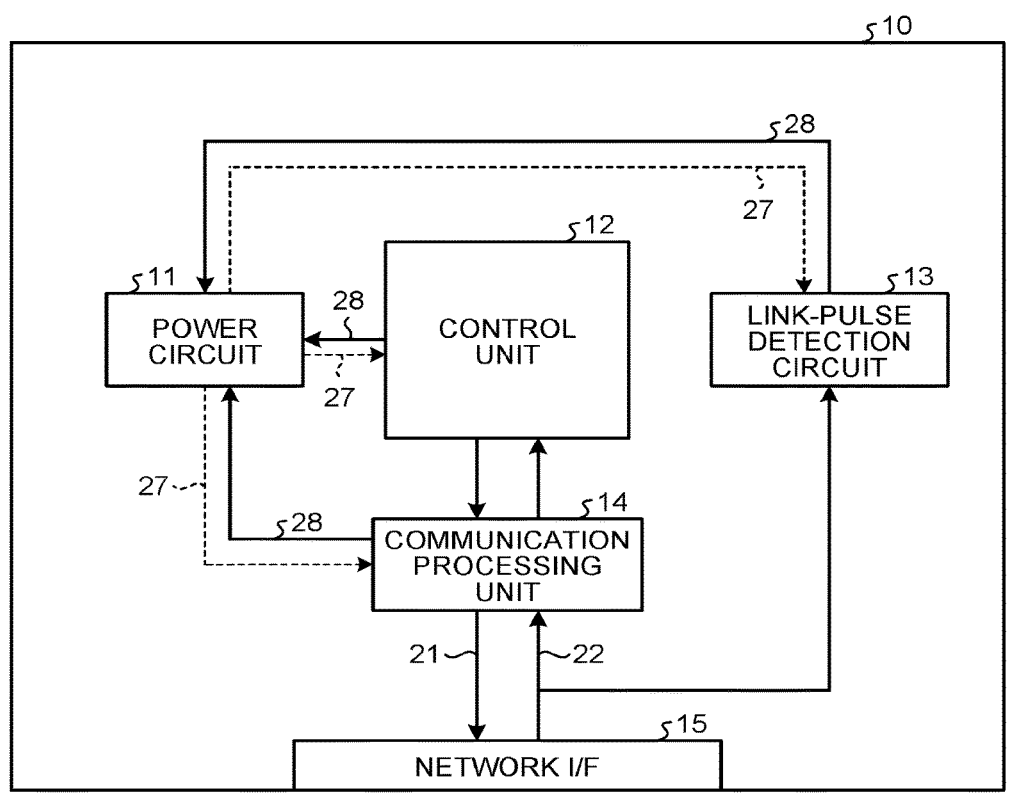
FIG. 20 is an example of the schematic configuration diagram of the network device (a seventh example)

FIG. 20 is an example of the schematic configuration diagram of the network device 10 (the seventh example). Although the configuration of the network device 10 in FIG. 20 is the same as in the first example, the communication processing unit 14 is connected to the power circuit 11 via the control signal line 28. If the communication processing unit 14 detects a magic packet during the WOL-compatible off mode WOM, the communication processing unit 14 controls the power circuit 11 so as to make the control unit 12 enter an energized state.

Figure 21:
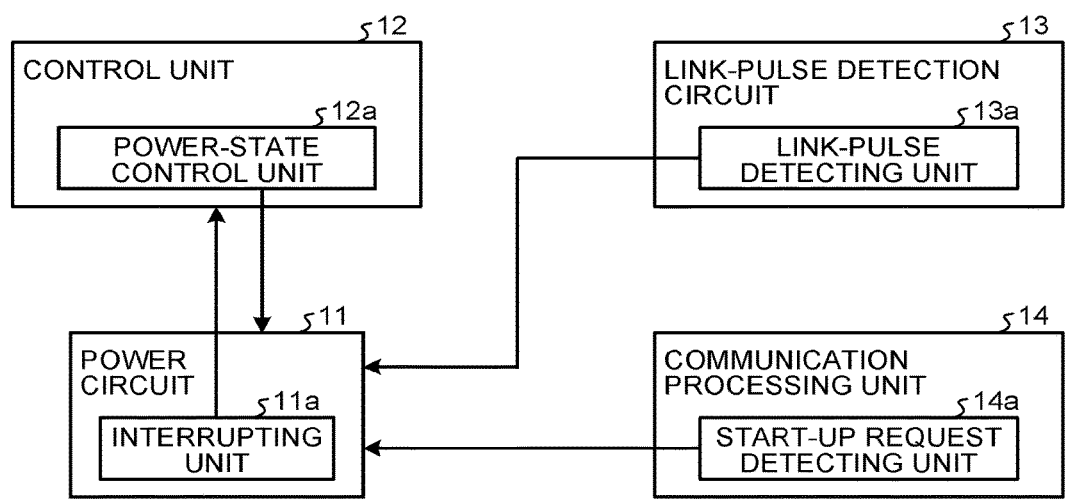
FIG. 21 is an example of the functional block diagram that illustrates the function related to the state transition of the network device (the seventh example)

FIG. 21 is an example of the functional block diagram that illustrates the function related to the state transition of the network device 10 according to the present example (the seventh example). In FIG. 21, the communication processing unit 14 includes a start-up request detecting unit 14a. The start-up request detecting unit 14a detects a magic packet, transmitted via a wired network (LAN cable), and controls the power circuit 11 so as to start up the control unit 12, thereby making the network device 10 transition to the standby mode SM.

Figure 22:
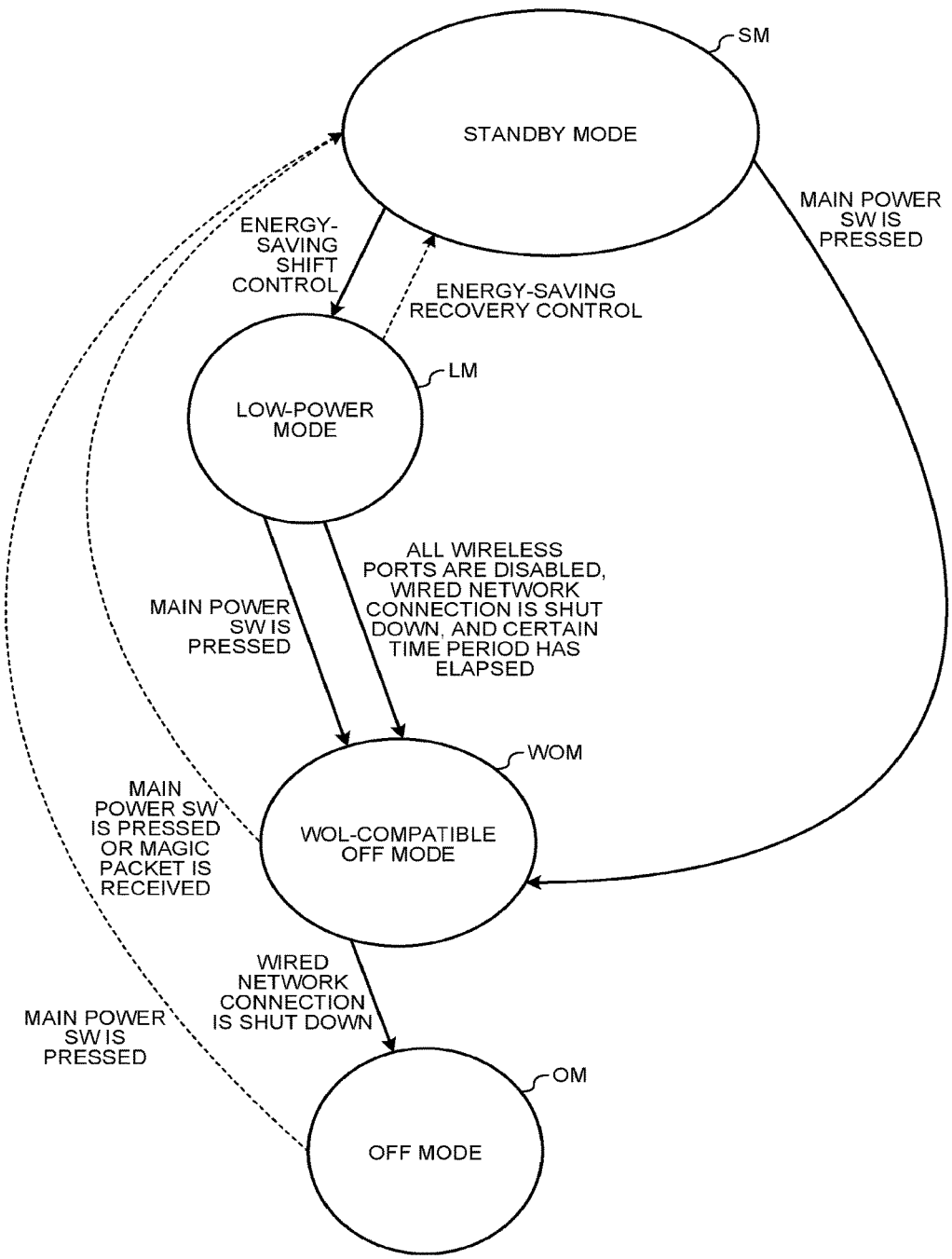
FIG. 22 is an example of the state transition diagram of the network device (the seventh example)

FIG. 22 is an example of the state transition diagram of the network device 10 according to the present example. The standby mode SM and the low-power mode LM are the same as in the first example. Furthermore, if the conditions are satisfied during the low-power mode LM, i.e., if the wired network connection is shut down, all the wireless ports are disabled, and a certain time period has elapsed, or if the main power switch is pressed, the operation mode of the network device 10 transitions to the WOL-compatible off mode WOM. Furthermore, if the main power switch is pressed during the standby mode SM, a transition is also made to the WOL-compatible off mode WOM.

If the main power switch is pressed or a magic packet is received by the communication processing unit 14 during the WOL-compatible off mode WOM, a transition is made to the standby mode SM. If no link pulse is detected (the wired network is not connected) during the WOL-compatible off mode WOM, a transition is made to the off mode OM. Furthermore, if the main power switch is pressed during the off mode OM, a transition is made to the standby mode SM. Specifically, although link pulses do no cause a transition to the standby mode SM, or the like, link pulses may keep the WOL-compatible off mode.

If the wired network is not connected (if no link pulse is detected), there is no possibility that the network device 10 returns to the standby mode SM, or the like, due to signals from the network. Therefore, during the off mode OM, the communication processing unit 14 and the link-pulse detection circuit 13 are in a de-energized state, whereby unnecessary electric power during the off mode OM may be reduced.

Figure 23:
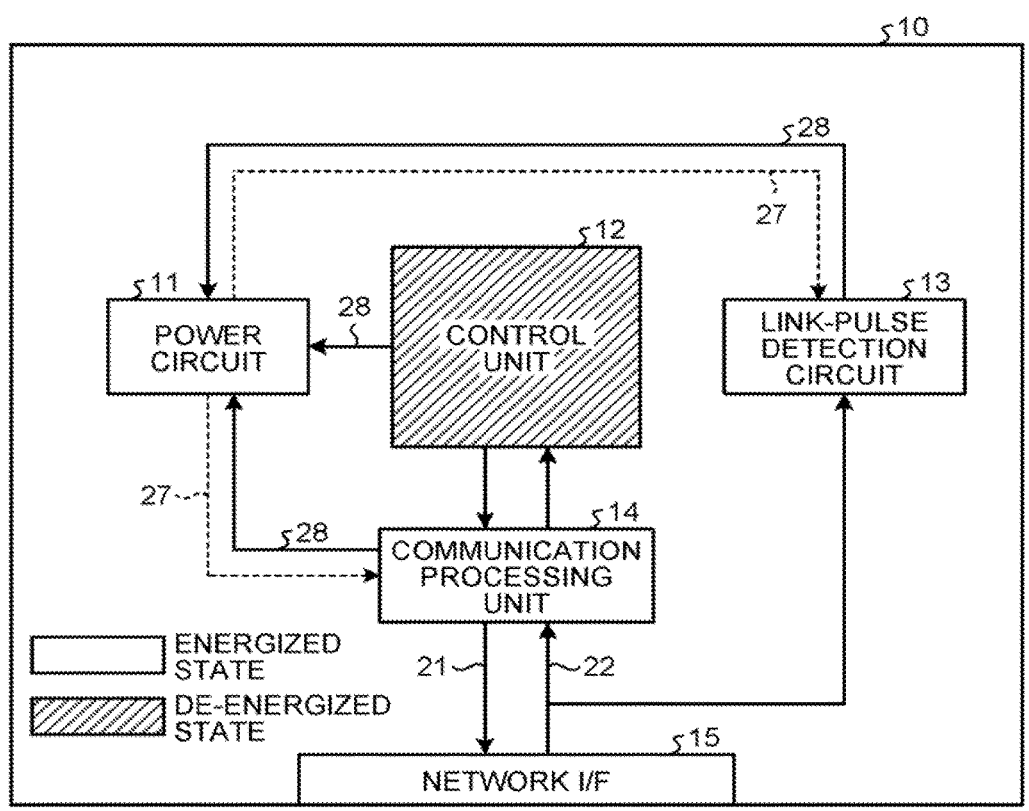
FIG. 23 is an example of the diagram that illustrates the power state of the network device in a WOL-compatible off mode (the seventh example)

FIG. 23 is an example of the diagram that illustrates the power state of the network device 10 in the WOL-compatible off mode WOM. During the WOL-compatible off mode WOM, the control unit 12 is in a de-energized state, and the communication processing unit 14, the link-pulse detection circuit 13, and the power circuit 11 are in an energized state. Conversely, during the off mode OM, the components are in a de-energized state except for the power circuit 11.

Figure 24:
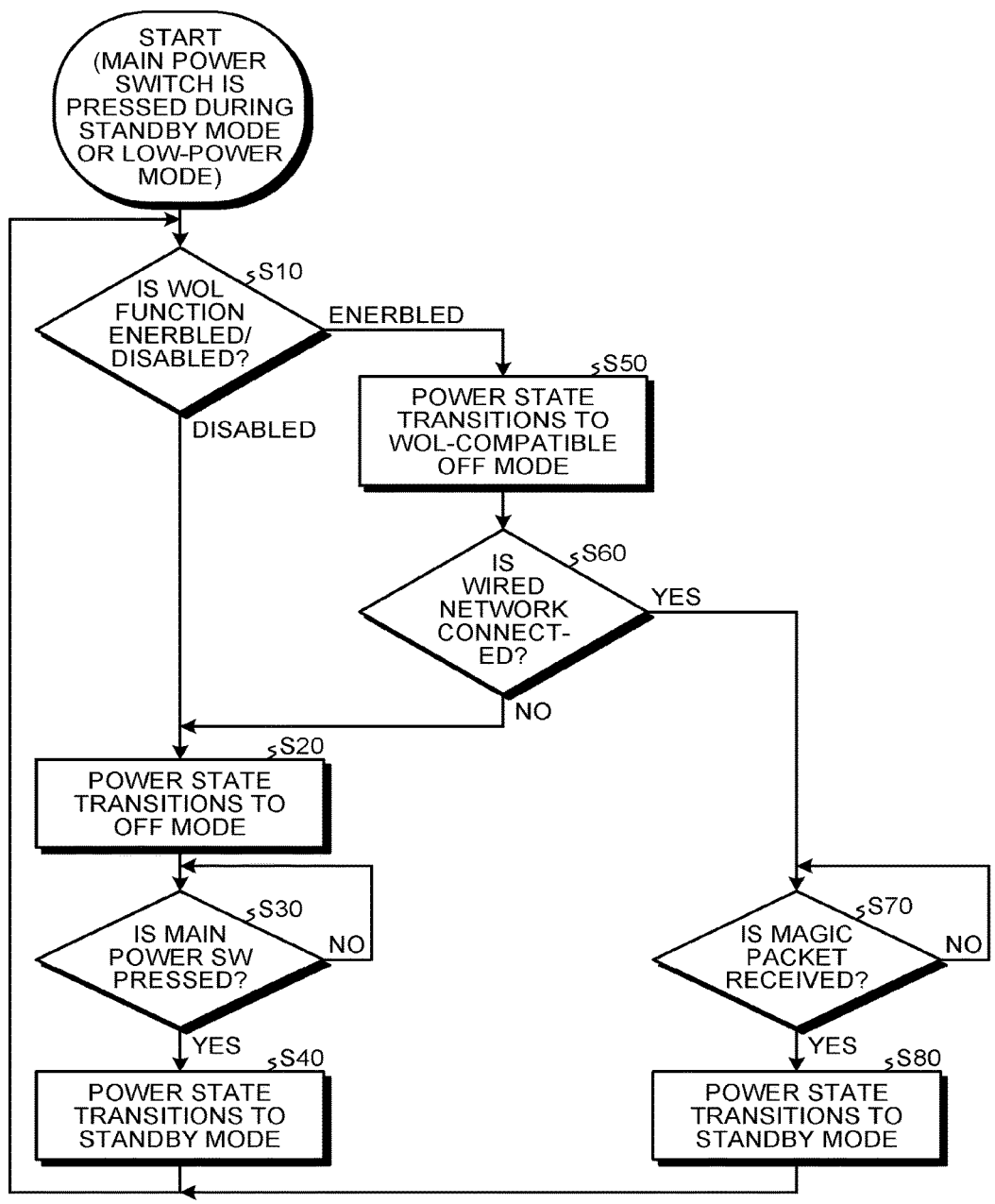
FIG. 24 is an example of the flowchart that illustrates the steps at which the power state transitions in the network device (the seventh example)

FIG. 24 is an example of the flowchart that illustrates the steps at which the power state transitions in the network device 10 according to the present example. The process in FIG. 24 is started when the main power switch is pressed during the standby mode SM or the low-power mode LM.

First, the power-state control unit 12a determines whether the WOL function is enabled or disabled (S10). Many network devices 10 allow users to specify the settings as to whether the WOL function is enabled or disabled. This is because there are many users who do not desire that the network device 10 is started up due to the WOL function.

If the WOL function is disabled, the power-state control unit 12a makes the power state transition to the off mode OM (S20). That is, a transition is made to the off mode OM without passing through the WOL-compatible off mode WOM. Therefore, the power-state control unit 12a performs control so as to make the components other than the power circuit 11 to be in a de-energized state.

Next, in the off mode OM, the interrupting unit 11a of the power circuit 11 determines whether the main power switch is pressed (S30). If the main power switch is not pressed, the off mode OM is retained while in standby.

If the main power switch is pressed, the interrupting unit 11a interrupts the control unit 12 so that the control unit 12 starts up, and the power-state control unit 12a makes the power state transition to the standby mode SM (S40).

Conversely, if the WOL function is enabled at Step S10, the power-state control unit 12a makes the power state transition to the WOL-compatible off mode WOM (S50). That is, the power circuit 11 is controlled so that the control unit 12 enters a de-energized state.

Then, the link-pulse detecting unit 13a determines whether the wired network is connected in the WOL-compatible off mode WOM (S60). That is, it is determined whether a link pulse is detected.

If a determination at Step S60 is No, the process proceeds to Step S20. That is, as the wired network is not connected, a transition is made to the off mode OM.

If a determination at Step S60 is Yes, the start-up request detecting unit 14a determines whether a magic packet is received in the WOL-compatible off mode WOM (S70).

If a determination at Step S70 is No, the power state is continuously the WOL-compatible off mode WOM as a link pulse is detected.

If a determination at Step S70 is Yes, the start-up request detecting unit 14a makes the power state transition to the standby mode SM using detection of a magic packet as a trigger (S80). That is, the power circuit 11 is controlled so that the control unit 12 transitions to an energized state.

As described above, if the wired network is not connected although the WOL is enabled, there is no possibility that a return is made due to signals via the network; therefore, the communication processing unit 14, which detects magic packets, is in a de-energized state so that the power consumption during the off mode OM may be reduced.

Figure 25:
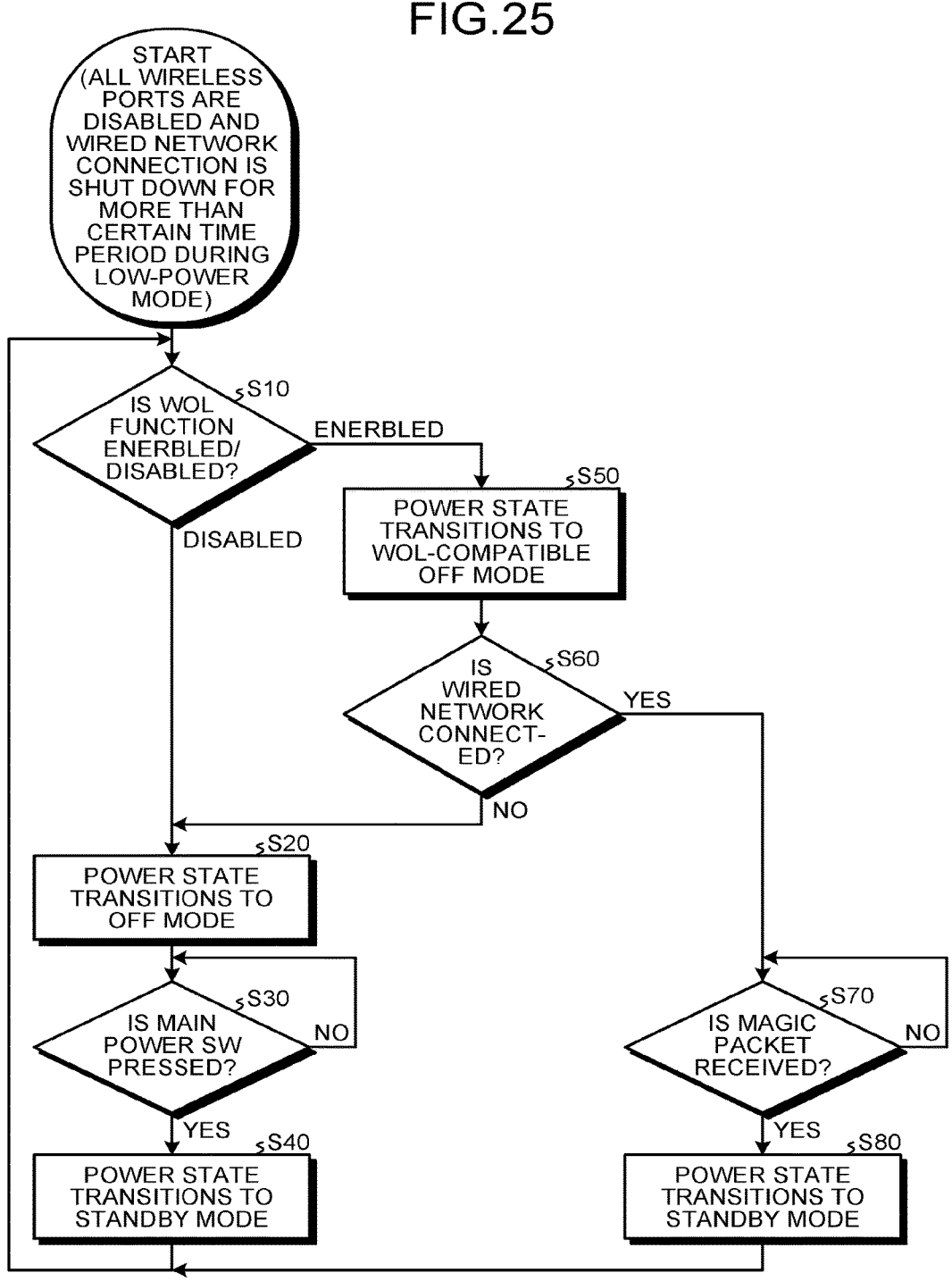
FIG. 25 is an example of the flowchart that illustrates the steps at which the power state transitions in the network device (the seventh example)

Here, FIG. 24 illustrates the process in a case where the main power switch is pressed during the standby mode SM or the low-power mode LM; however, as illustrated in FIG. 25, the power state transitions in the same manner in a case where the conditions are satisfied, that is, if the wired network connection is shut down, all the wireless ports are disabled, and a certain time period has elapsed. Here, the control in FIG. 25 conforms to the specifications of Erp directive Lot 6.

Eighth Example

According to the seventh example, if a transition is made to the off mode OM once, it is difficult to return to the standby mode SM unless the main power switch is pressed. In the present example, an explanation is given of the network device 10 in which, with the provision of a link-pulse detection compatible off mode LOM that is the low power state where the communication processing unit 14 is in an energized state, a transition may be made to the WOL-compatible off mode WOM if a wired network connection is detected after the wired network is disconnected.

Thus, even if the wired network is disconnected once, reception of magic packets and the state transition are possible when the wired network is connected again.

The hardware configuration and the functional block may be the same as in the seventh example.

Figure 26:
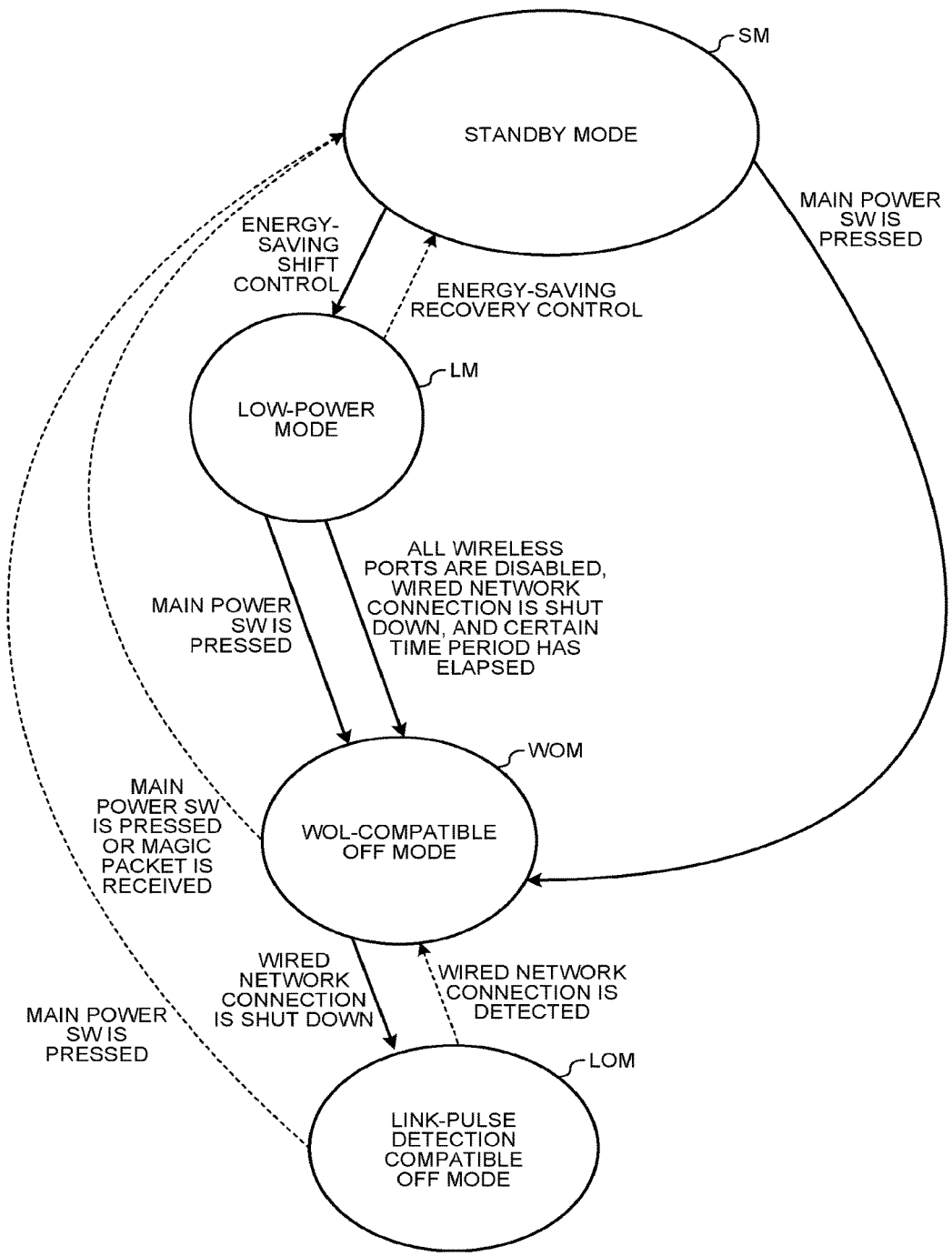
FIG. 26 is an example of the state transition diagram of the network device (an eighth example)

FIG. 26 illustrates an example of the state transition diagram of the network device 10 according to the present example. Here, in FIG. 26, the differences from FIG. 22 are principally explained. In FIG. 26, the off mode OM of FIG. 22 is replaced with the link-pulse detection compatible off mode LOM. The condition for transition from the WOL-compatible off mode WOM to the link-pulse detection compatible off mode LOM is a disconnection of the wired network. Furthermore, the network device 10 may transition from the link-pulse detection compatible off mode LOM to the WOL-compatible off mode WOM. The transition condition is a connection of the wired network.

Figure 27:
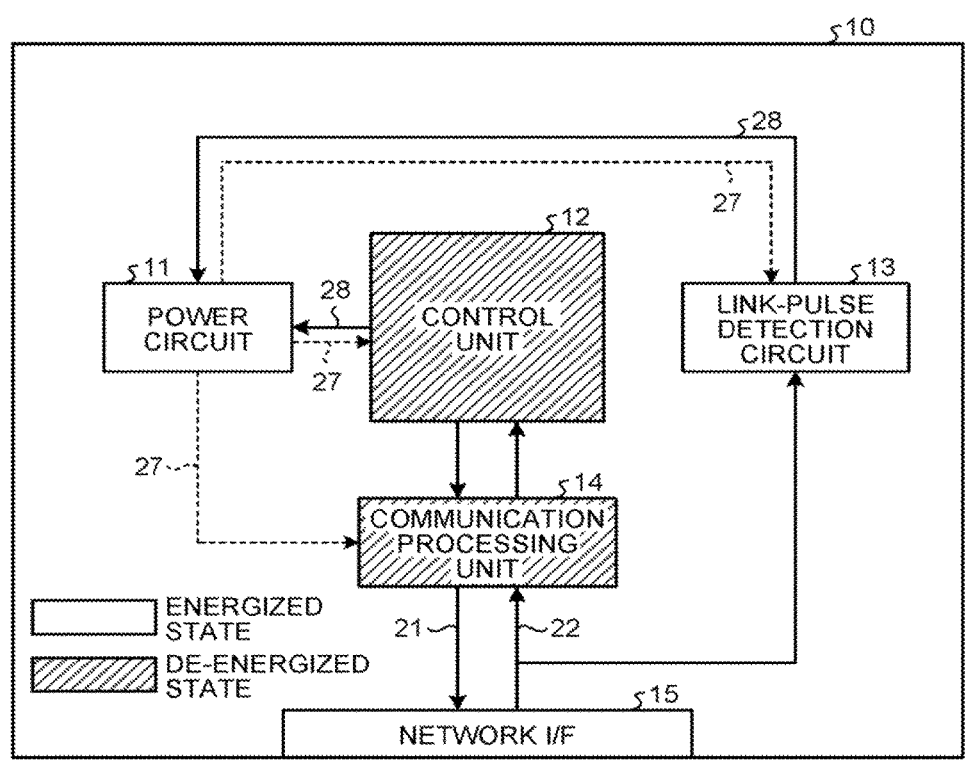
FIG. 27 is an example of the diagram that illustrates the power state of the network device in a link-pulse detection compatible off mode (the eighth example)

FIG. 27 is an example of the diagram that illustrates the power state of the network device 10 in the link-pulse detection compatible off mode LOM. During the link-pulse detection compatible off mode LOM, the control unit 12 and the communication processing unit 14 are in a de-energized state, and the link-pulse detection circuit 13 and the power circuit 11 are in an energized state. Therefore, contrary to the WOL-compatible off mode WOM, the communication processing unit 14 is in a de-energized state so that the power consumption is further reduced.

Figure 28:
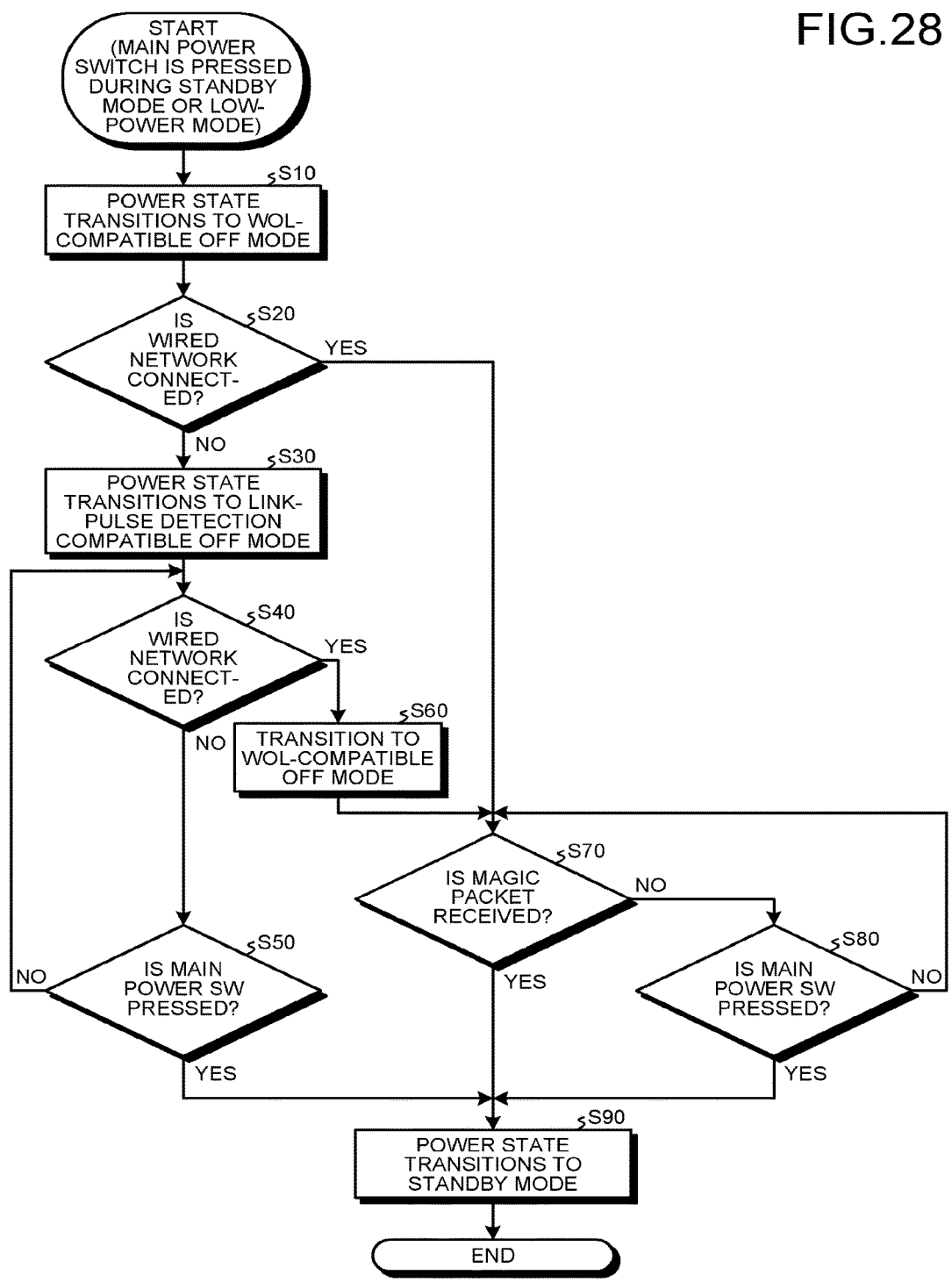
FIG. 28 is an example of the flowchart that illustrates the steps at which the power state transitions in the network device (the eighth example)

FIG. 28 is an example of the flowchart that illustrates the steps at which the power state transitions in the network device 10 according to the present example. The process of FIG. 28 is started when the main power switch is pressed during the standby mode SM or the low-power mode LM.

First, the power-state control unit 12a makes the power state transition to the WOL-compatible off mode WOM (S10). That is, the power circuit 11 is controlled so that the control unit 12 transitions to a de-energized state.

Then, the link-pulse detecting unit 13a determines whether the wired network is connected during the WOL-compatible off mode WOM (S20). That is, it is determined whether a link pulse is detected.

If a determination at Step S20 is No, the process proceeds to Step S30. Specifically, as the wired network is not connected, the link-pulse detecting unit 13a makes the power state transition to the link-pulse detection compatible off mode LOM (S30). That is, the power circuit 11 is controlled so that the communication processing unit 14 enters a de-energized state.

Next, still in the link-pulse detection compatible off mode LOM, the link-pulse detecting unit 13a determines whether the wired network is connected (S40). That is, it is determined whether a link pulse is detected.

If a determination at Step S40 is No, the interrupting unit 11a of the power circuit 11 determines whether the main power switch is pressed (S50). If a determination at Step S50 is No, the process returns to Step S40.

If a determination at Step S40 is Yes, the link-pulse detecting unit 13a makes the power state transition to the WOL-compatible off mode WOM (S60). That is, the power circuit 11 is controlled so that the communication processing unit 14 enters an energized state.

Furthermore, if a determination at Step S20 is Yes, and after Step S60, the start-up request detecting unit 14a of the communication processing unit 14 determines whether a magic packet is received (S70).

If a determination at Step S70 is No, the interrupting unit 11a of the power circuit 11 determines whether the main power switch is pressed (S80). If a determination at Step S80 is No, the process returns to Step S70.

If a determination at Step S70 is Yes, or if determinations at Step S50 and S80 are Yes, the network device 10 transitions to the standby mode SM (S90). That is, if a determination at Step S70 is Yes, the start-up request detecting unit 14a of the communication processing unit 14 has received a magic packet, and therefore controls the power circuit 11 so as to make the control unit 12 enter an energized state. If a determination at Step S50 is Yes, the interrupting unit 11a of the power circuit 11 makes the control unit 12 enter an energized state so that the power-state control unit 12a of the control unit 12 controls the power circuit 11 so as to make the communication processing unit 14 enter an energized state. If a determination at Step S80 is Yes, the interrupting unit 11a of the power circuit 11 makes the control unit 12 enter an energized state.

Due to the above-described process, even if the wired network is disconnected once, reception of magic packets and state transition are possible when the wired network is connected again.

Figure 29:
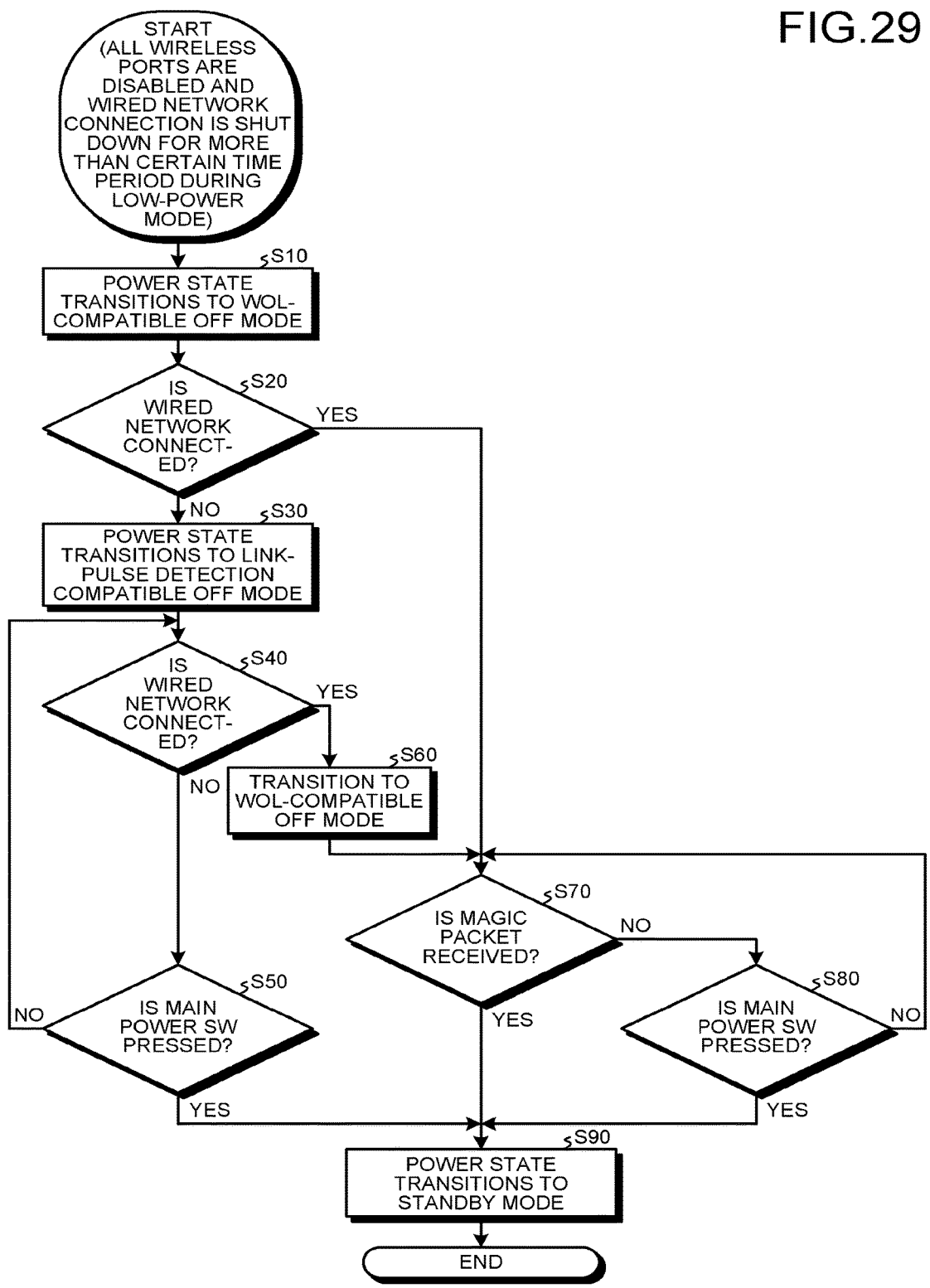
FIG. 29 is an example of the flowchart that illustrates the steps at which the power state transitions in the network device (the eighth example)

Here, FIG. 28 illustrates the process in a case where the main power switch is pressed during the standby mode SM or the low-power mode LM; however, as illustrated in FIG. 29, the power state transitions in the same manner if the conditions are satisfied, that is, if the wired network connection is shut down, all the wireless ports are disabled, and a certain time period has elapsed. Here, the control in FIG. 29 conforms to the specifications of Erp directive Lot 6.

Ninth Example

In the present example, an explanation is given of the network device 10 that transitions to the automatic-transition off mode AOM, during which the power consumption may be reduced as compared to the seventh example in a case where all the wireless ports are disabled, the wired network connection is shut down, and a certain period of time has elapsed according to the seventh example.

Here, the hardware configuration and the functional block may be the same as in the seventh example.

Figure 30:
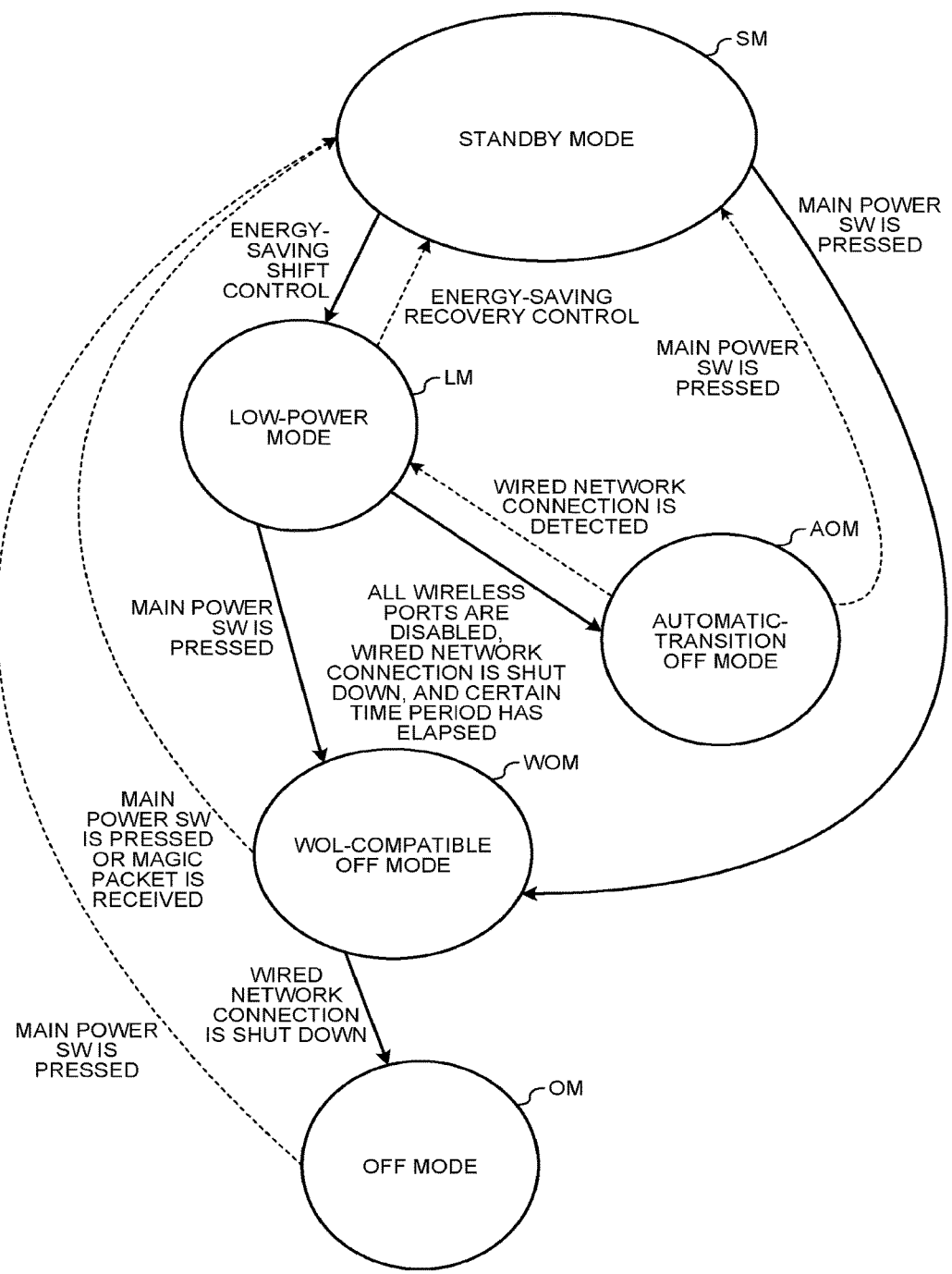
FIG. 30 is an example of the state transition diagram of the network device (a ninth example)

FIG. 30 illustrates an example of the state transition diagram of the network device 10 according to the present example. Here, in FIG. 30, the differences from FIG. 22 are principally explained. In FIG. 30, the power states newly include the automatic-transition off mode AOM. The conditions for transition from the low-power mode LM to the automatic-transition off mode AOM are that all the wireless ports are disabled, the wired network connection is shut down, and a certain period of time has continued. The condition for transition from the automatic-transition off mode AOM to the low-power mode LM is that the wired network is connected. Furthermore, the condition for transition from the automatic-transition off mode AOM to the standby mode SM is that the main power switch is pressed.

Figure 31:
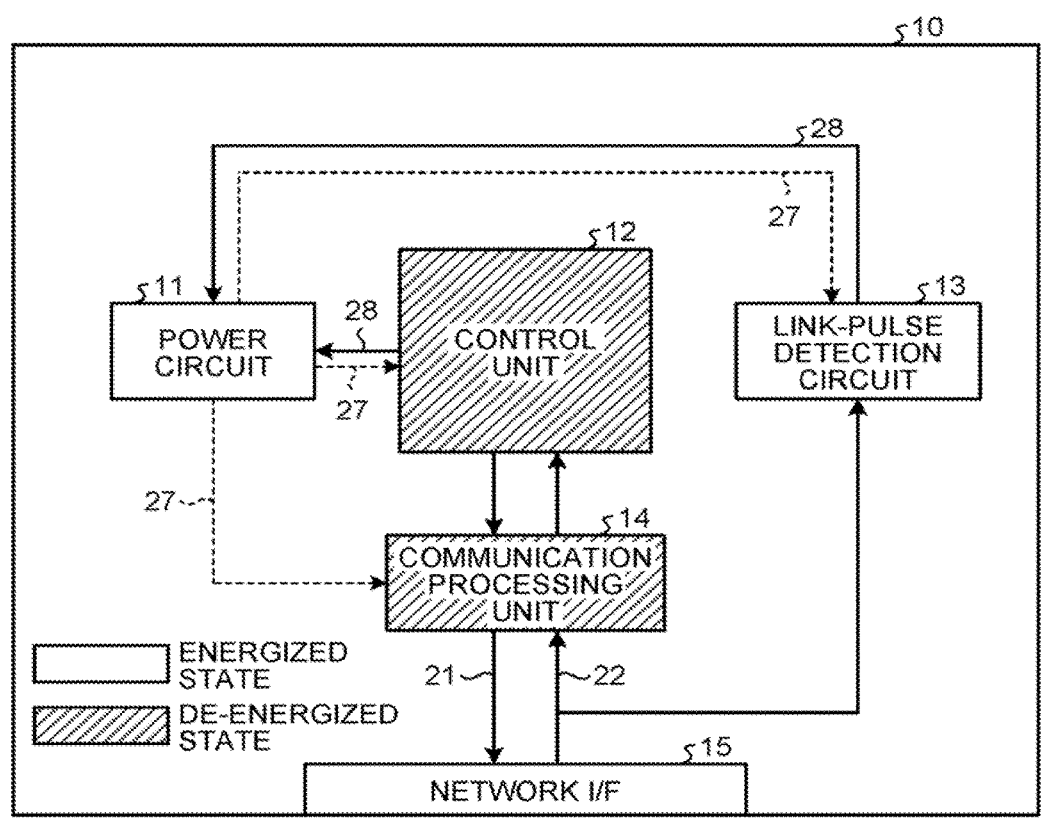
FIG. 31 is an example of the diagram that illustrates the power state of the network device in the automatic-transition off mode (the ninth example)

FIG. 31 is an example of the diagram that illustrates the power state of the network device 10 in the automatic-transition off mode AOM. During the automatic-transition off mode AOM, the control unit 12 and the communication processing unit 14 are in a de-energized state, and the link-pulse detection circuit 13 and the power circuit 11 are in an energized state. Therefore, contrary to the WOL-compatible off mode WOM, the communication processing unit 14 is in a de-energized state, whereby the power consumption is reduced.

Figure 32:
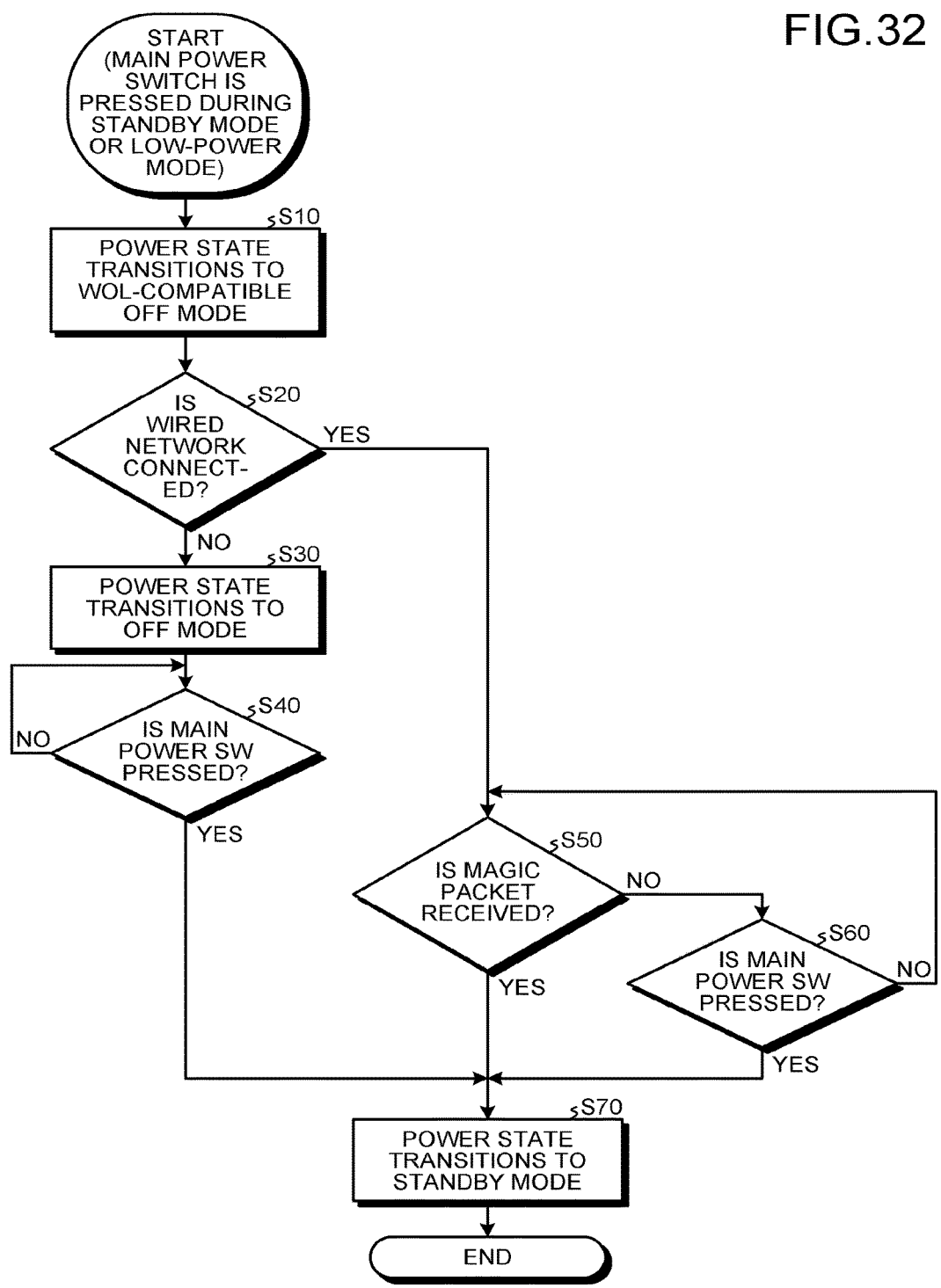
FIG. 32 is an example of the flowchart that illustrates the steps at which the power state transitions in the network device (the ninth example)

FIG. 32 is an example of the flowchart that illustrates the steps at which the power state transitions in the network device 10 according to the present example. The process of FIG. 32 is started when the main power switch is pressed during the standby mode SM or the low-power mode LM.

First, the power-state control unit 12a makes the power state transition to the WOL-compatible off mode WOM (S10). Specifically, the power circuit 11 is controlled so that the control unit 12 transitions to a de-energized state.

Then, the link-pulse detecting unit 13a determines whether the wired network is connected during the WOL-compatible off mode WOM (S20). That is, it is determined whether a link pulse is detected.

If a determination at Step S20 is No, the link-pulse detecting unit 13a makes the power state transition to the off mode OM as the wired network is not connected (S30). Specifically, the power circuit 11 is controlled so that the communication processing unit 14 and the link-pulse detection circuit 13 enter a de-energized state.

Next, the interrupting unit 11a of the power circuit 11 determines whether the main power switch is pressed (S40). If a determination at Step S40 is No, the off mode OM is kept, and the process returns to Step S40.

If a determination at Step S20 is Yes, the start-up request detecting unit 14a of the communication processing unit 14 determines whether a magic packet is received (S50).

If a determination at Step S50 is No, the interrupting unit 11a of the power circuit 11 determines whether the main power switch is pressed (S60). If a determination at Step S60 is No, the process returns to Step S50.

If a determination at Step S50 is Yes, or if determinations at Step S40 and S60 are Yes, the network device 10 transitions to the standby mode SM (S70). That is, if a determination at Step S50 is Yes, the start-up request detecting unit 14a of the communication processing unit 14 has received a magic packet, and thus controls the power circuit 11 so as to make the control unit 12 enter an energized state. If a determination at Step S40 is Yes, the interrupting unit 11a of the power circuit 11 makes the control unit 12 enter an energized state, and the power-state control unit 12a of the control unit 12 controls the power circuit 11 so as to make the communication processing unit 14 enter an energized state. If a determination at Step S60 is Yes, the interrupting unit 11a of the power circuit 11 makes the control unit 12 enter an energized state.

Thus, a transition is automatically made to the automatic-transition off mode AOM if all the wireless ports are disabled, the wired network connection is shut down, and a certain period of time has continued, whereby the power consumption may be reduced, as compared to the seventh example.

Tenth Example

In the present example, an explanation is given of the network device 10 that has the power state where the off mode OM according to the ninth example is replaced with the link-pulse detection compatible off mode LOM. Due to disconnection of the wired network during the WOL-compatible off mode WOM, a transition is made to the link-pulse detection compatible off mode LOM; therefore, if the wired network is connected again, a transition may be made to the WOL-compatible off mode WOM. Thus, even if the wired network is disconnected once, reception of magic packets and state transition are possible when the wired network is connected.

Here, the hardware configuration and the functional block may be the same as in the seventh example.

Figure 33:
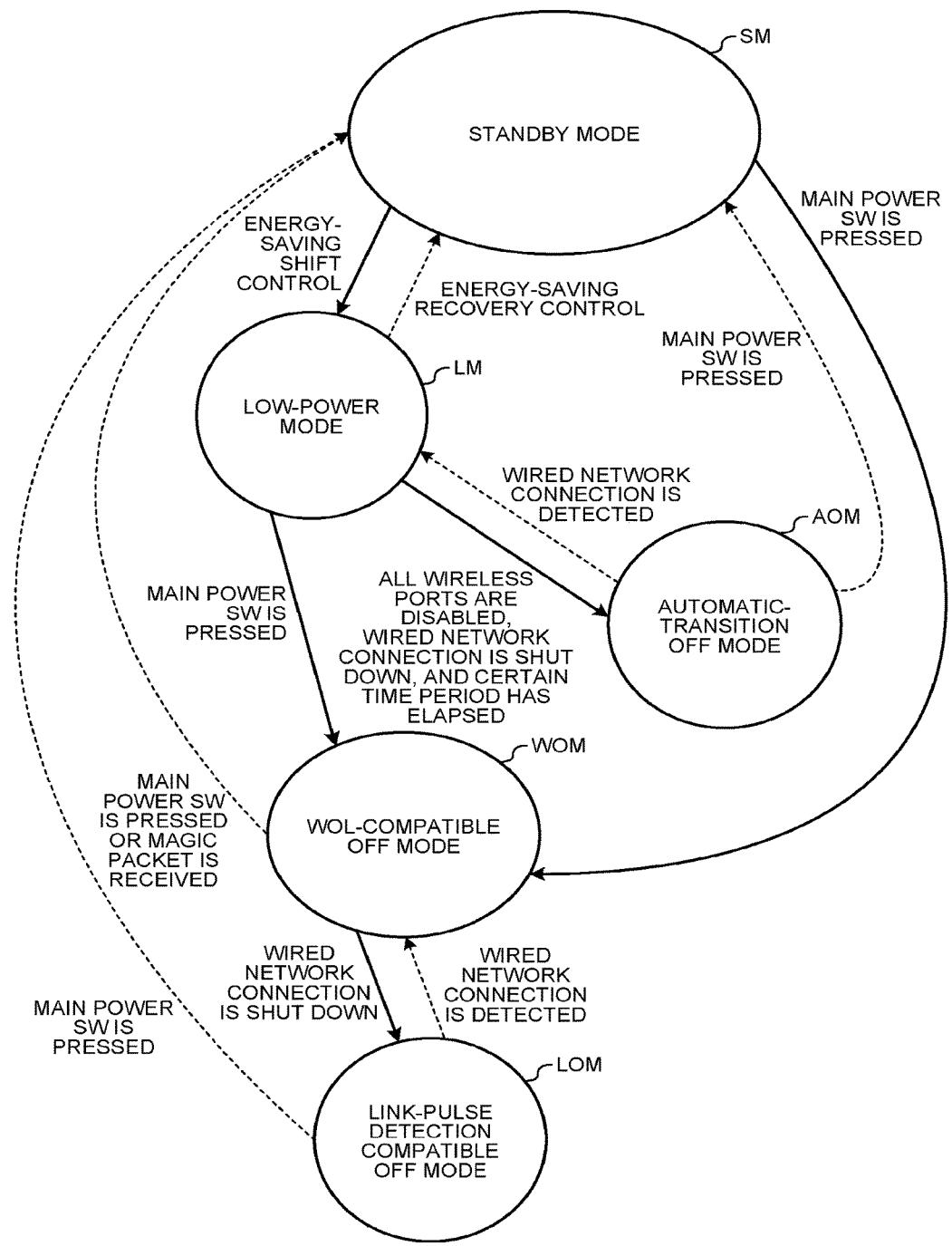
FIG. 33 is an example of the state transition diagram of the network device (a tenth example)

FIG. 33 illustrates an example of the state transition diagram of the network device 10 according to the present example. Here, in FIG. 33, the differences from FIG. 30 are principally explained. In FIG. 33, the off mode OM of FIG. 30 is replaced with the link-pulse detection compatible off mode LOM. The condition for transition from the WOL-compatible off mode WOM to the link-pulse detection compatible off mode LOM and the condition for transition from the link-pulse detection compatible off mode LOM to the standby mode SM are the same as in FIG. 26.

Figure 34:
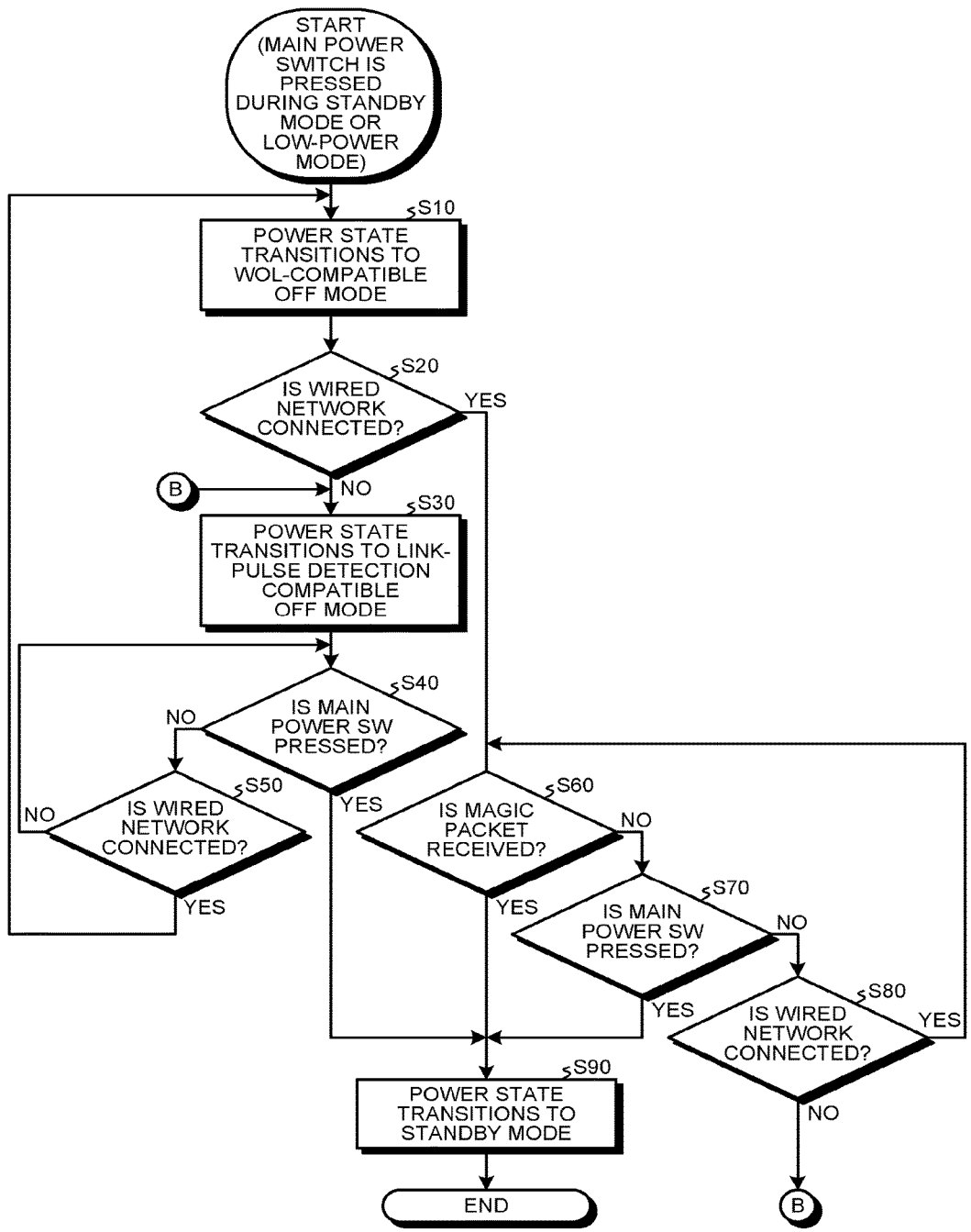
FIG. 34 is an example of the flowchart that illustrates the steps at which the power state transitions in the network device (the tenth example)

FIG. 34 is an example of the flowchart that illustrates the steps at which the power state transitions in the network device 10 according to the present example. The process of FIG. 34 is started when the main power switch is pressed during the standby mode SM or the low-power mode LM.

First, the power-state control unit 12a makes the power state transition to the WOL-compatible off mode WOM (S10). Specifically, the power circuit 11 is controlled so that the control unit 12 transitions to a de-energized state.

Then, the link-pulse detecting unit 13a determines whether the wired network is connected in the WOL-compatible off mode WOM (S20). That is, it is determined whether a link pulse is detected.

If a determination at Step S20 is No, the link-pulse detecting unit 13a makes the power state transition to the link-pulse detection compatible off mode LOM as the wired network is not connected (S30). Specifically, the power circuit 11 is controlled so that the communication processing unit 14 and the control unit 12 are in a de-energized state.

Next, the interrupting unit 11a of the power circuit 11 determines whether the main power switch is pressed (S40). If a determination at Step S40 is No, the link-pulse detecting unit 13a determines whether the wired network is connected (S50). This is because, during the link-pulse detection compatible off mode LOM, the link-pulse detecting unit 13a is capable of detecting link pulses.

If a determination at Step S50 is No, the link-pulse detection compatible off mode LOM is kept, and the process returns to Step S40.

If a determination at Step S50 is Yes, the link-pulse detecting unit 13a makes the power state transition to the WOL-compatible off mode WOM (S10). Specifically, the power circuit 11 is controlled so that the communication processing unit 14 enters an energized state. The control unit 12 is continuously in a de-energized state.

If a determination at Step S20 is Yes, the start-up request detecting unit 14a of the communication processing unit 14 determines whether a magic packet is received (S60).

If a determination at Step S60 is No, the interrupting unit 11a of the power circuit 11 determines whether the main power switch is pressed (S70).

If a determination at Step S70 is No, the link-pulse detecting unit 13a determines whether the wired network is connected (S80). This determination is to determine whether a transition is to be made to the link-pulse detection compatible off mode LOM. If a determination at Step S80 is Yes, the process returns to Step S60.

If a determination at Step S80 is No, the link-pulse detecting unit 13a makes the power state transition to the link-pulse detection compatible off mode LOM (S30). Specifically, the power circuit 11 is controlled so that the communication processing unit 14 enters a de-energized state.

If determinations at Step S40 and S70 are Yes, or if a determination at Step S60 is Yes, the network device 10 transitions to the standby mode SM (S90). Specifically, if a determination at Step S60 is Yes, the start-up request detecting unit 14a of the communication processing unit 14 has received a magic packet, and therefore controls the power circuit 11 so that the control unit 12 enters an energized state. If a determination at Step S40 is Yes, the interrupting unit 11a of the power circuit 11 makes the control unit 12 enter an energized state, and the power-state control unit 12a of the control unit 12 controls the power circuit 11 so that the communication processing unit 14 enters an energized state. If a determination at Step S70 is Yes, the interrupting unit 11a of the power circuit 11 makes the control unit 12 enter an energized state.

As described above, with the network device 10 according to the present example, even if the wired network is disconnected once, link pulses are detected so that the reception of magic packets and the state transition are possible when the wired network is connected again.

Eleventh Example

In the present example, an explanation is given of the network device 10 where the power state may transition from the automatic-transition off mode AOM to the WOL-compatible off mode WOM in the tenth example. If the wired network is connected after a transition is made to the automatic-transition off mode AOM, a transition may be made to the WOL-compatible off mode WOM without passing through the low-power mode LM; thus, the WOL function may be enabled with low electric power as compared to the tenth example.

Here, the hardware configuration and the functional block may be the same as in the seventh example.

Figure 35:
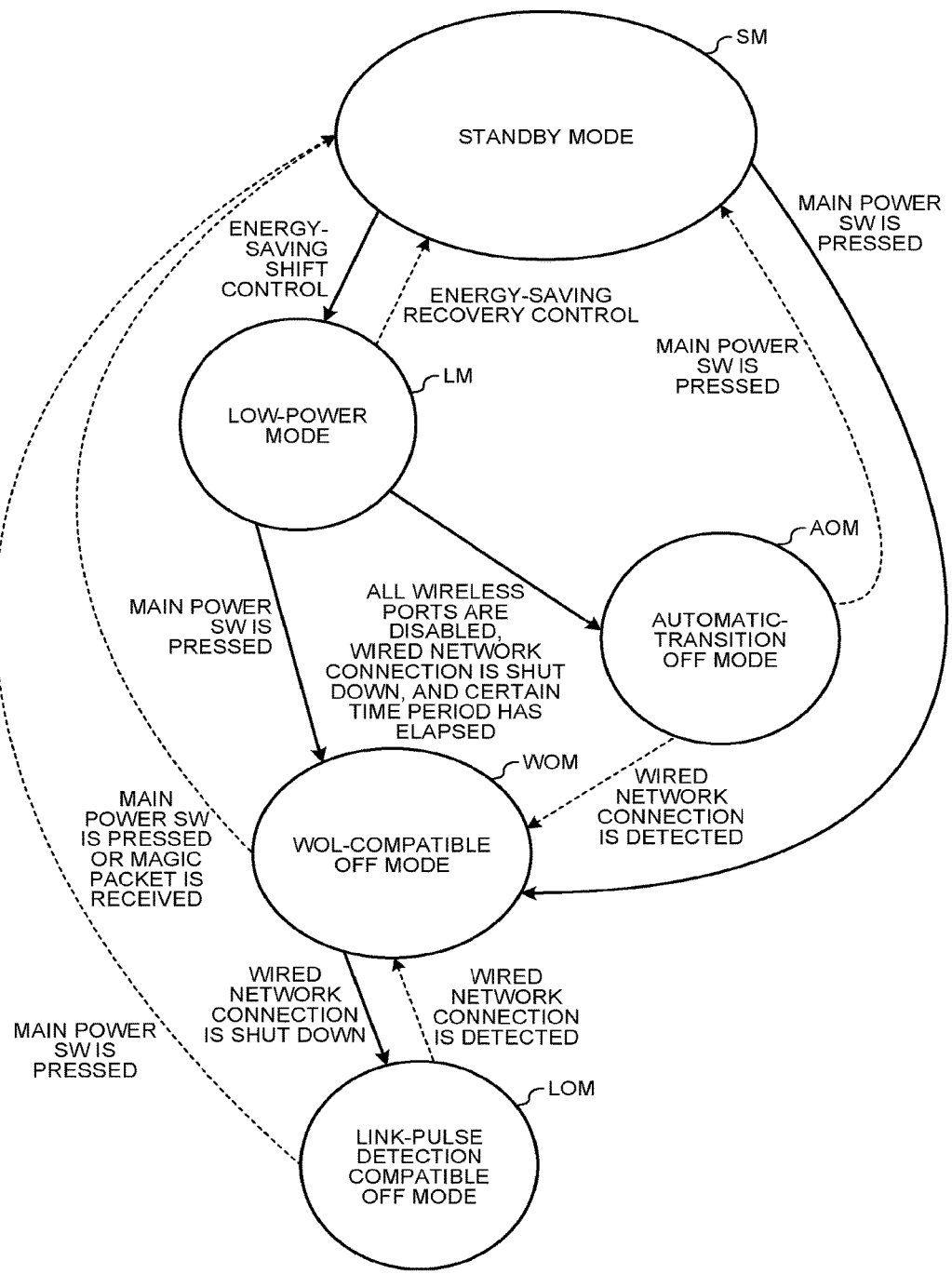
FIG. 35 is an example of the state transition diagram of the network device (an eleventh example)

FIG. 35 illustrates an example of the state transition diagram of the network device 10 according to the present example. Here, in FIG. 35, the differences from FIG. 33 are principally explained. In FIG. 35, a transition may be made from the automatic-transition off mode AOM to the WOL-compatible off mode WOM. The condition for transition from the automatic-transition off mode AOM to the WOL-compatible off mode WOM is that the wired network is connected. Furthermore, a transition from the automatic-transition off mode AOM to the low-power mode LM is not made.

Figure 36:
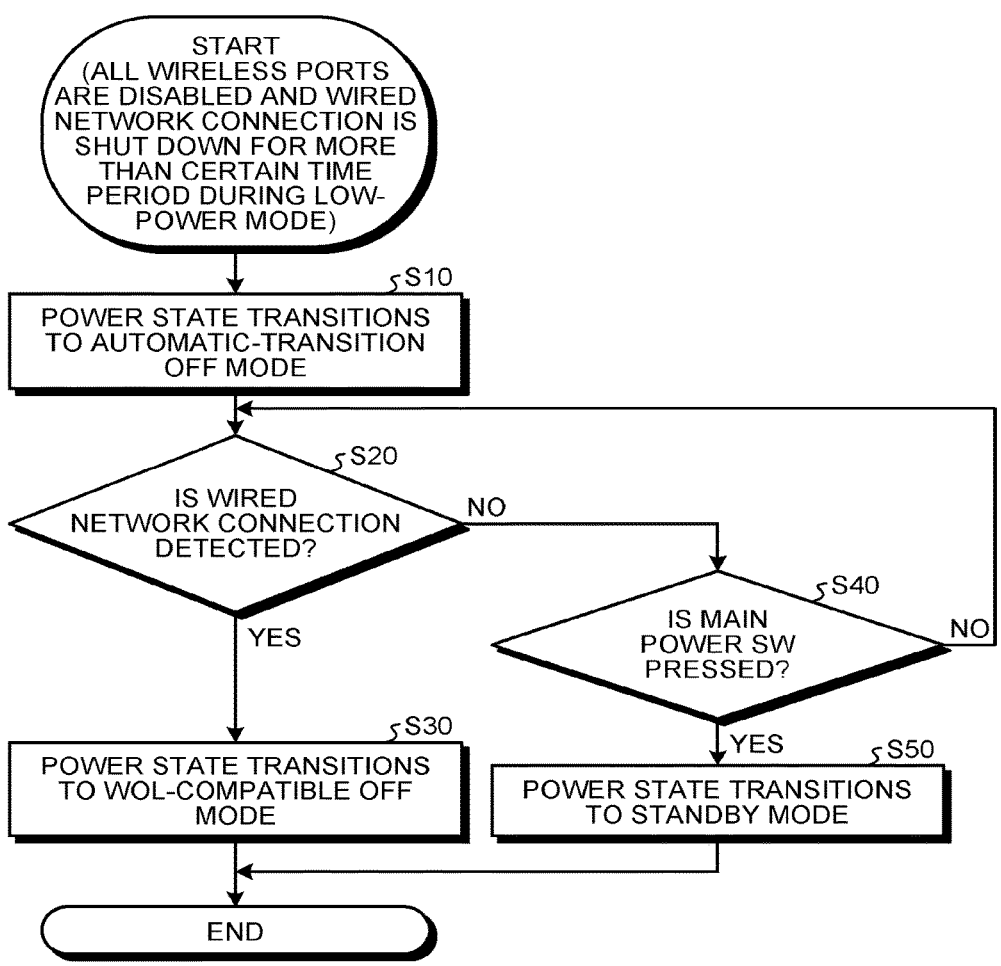
FIG. 36 is an example of the flowchart that illustrates the steps at which the power state transitions in the network device (the eleventh example)

FIG. 36 is an example of the flowchart that illustrates the steps at which the power state transitions in the network device 10 according to the present example. The process of FIG. 36 is started when the conditions are satisfied during the low-power mode LM, that is, if the wired network connection is shut down, all the wireless ports are disabled, and a certain time period has elapsed.

First, the power-state control unit 12a makes the power state transition to the automatic-transition off mode AOM (S10). Specifically, the power circuit 11 is controlled so that the control unit 12 and the communication processing unit 14 transition to a de-energized state.

Then, the link-pulse detecting unit 13a determines whether the wired network is connected during the automatic-transition off mode AOM (S20). That is, it is determined whether a link pulse is detected.

If a determination at Step S20 is Yes, the wired network is connected, and therefore the link-pulse detecting unit 13a makes the power state transition to the WOL-compatible off mode WOM (S30). Specifically, the power circuit 11 is controlled so that the communication processing unit 14 enters an energized state.

If a determination at Step S20 is No, the wired network is not connected, and therefore the interrupting unit 11a of the power circuit 11 determines whether the main power switch is pressed (S40). If a determination at Step S40 is No, the automatic-transition off mode AOM is kept.

If a determination at Step S40 is Yes, the power circuit 11 makes the power state of the network device 10 transition to the standby mode SM (S50). Specifically, the interrupting unit 11a of the power circuit 11 makes the control unit 12 enter an energized state, and the power-state control unit 12a of the control unit 12 controls the power circuit 11 so that the communication processing unit 14 enters an energized state.

Furthermore, the transition in a case where the main power switch is pressed during the standby mode SM or the low-power mode LM is the same as that in the tenth example.

As described above, with the network device 10 according to the present example, if the wired network is connected after a transition is made to the automatic-transition off mode AOM, a transition may be made to the WOL-compatible off mode WOM without passing through the low-power mode LM; thus, the WOL function may be enabled with low electric power as compared to the tenth example.

Twelfth Example

In the present example, an explanation is given of the network device 10 that can transition to the standby mode using the WOL if the wired network is disconnected in the low-power mode LM.

Figure 37:
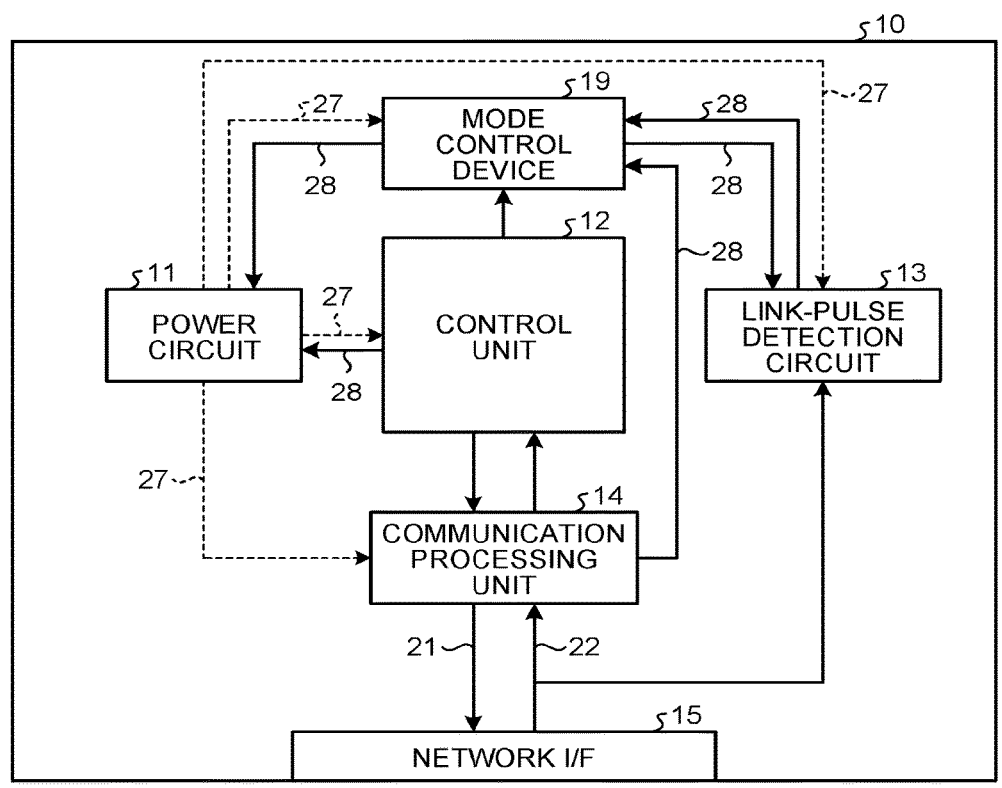
FIG. 37 is an example of the schematic configuration diagram of the network device (a twelfth example)

FIG. 37 is an example of the schematic configuration diagram of the network device 10 (the twelfth example). In FIG. 37, the network device 10 includes a mode control device 19. The mode control device 19 functions as an information processing device, and is connected to the power circuit 11, the control unit 12, the communication processing unit 14, and the link-pulse detection circuit 13 via the control signal line 28. According to the present example, the mode control device 19 controls the power circuit 11 so as to make the power state transition. For example, a notification that a link pulse has been detected is acquired from the link-pulse detection circuit 13 and the power circuit 11 is controlled so that a transition is made to the WOL-compatible off mode WOM. Furthermore, a notification that a magic packet has been received is acquired from the communication processing unit 14 and the power circuit 11 is controlled so that a transition is made to the standby mode SM.

If the communication processing unit 14 detects magic packets in an energized state, the power circuit 11 needs interfaces for both the communication processing unit 14 and the link-pulse detection circuit 13. However, with the provision of the mode control device 19, the power circuit 11 needs to include an interface with the mode control device 19.

Furthermore, as the power consumption of the mode control device 19 is lower than of the control unit 12, the power consumption may be reduced, as compared to a case where the control unit 12 is in an energized state.

Figure 38:
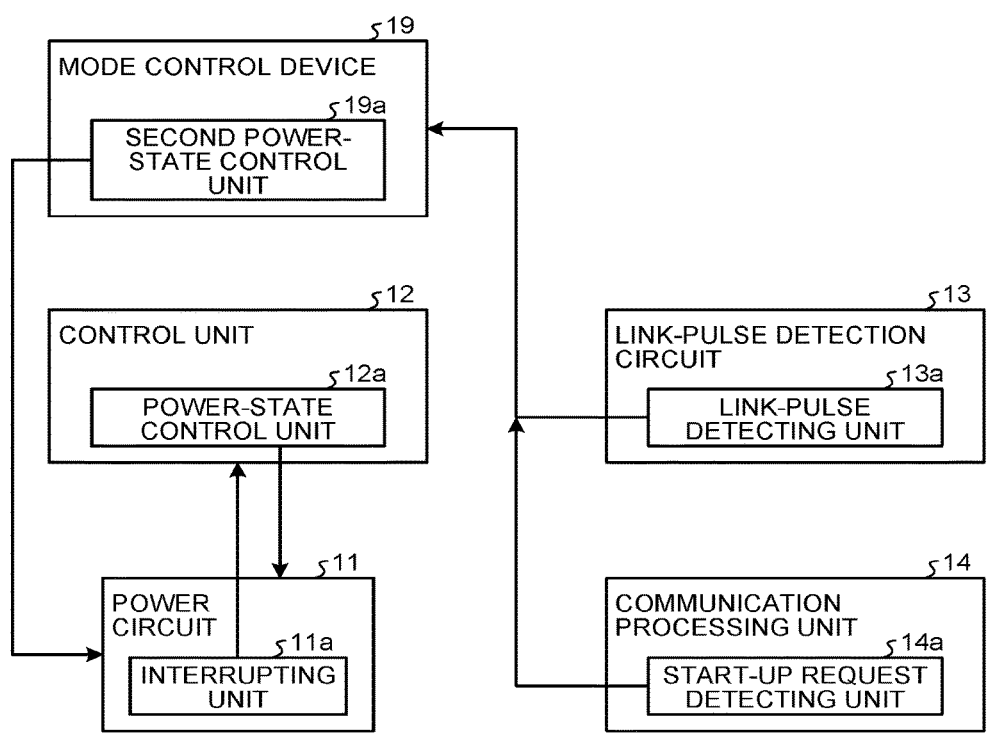
FIG. 38 is an example of the functional block diagram that illustrates the function related to the state transition of the network device (the twelfth example)

FIG. 38 is an example of the functional block diagram that illustrates the function related to the state transition of the network device 10 according to the present example. As illustrated in FIG. 38, the mode control device 19 includes a second power-state control unit 19a. The second power-state control unit 19a controls the power state if the control unit 12 is in a de-energized state. For example, if the link-pulse detecting unit 13a detects a link pulse, or if the start-up request detecting unit 14a of the communication processing unit 14 detects a magic packet, the power circuit 11 is controlled in accordance with the defined state transition so that the power state transitions.

Figure 39:
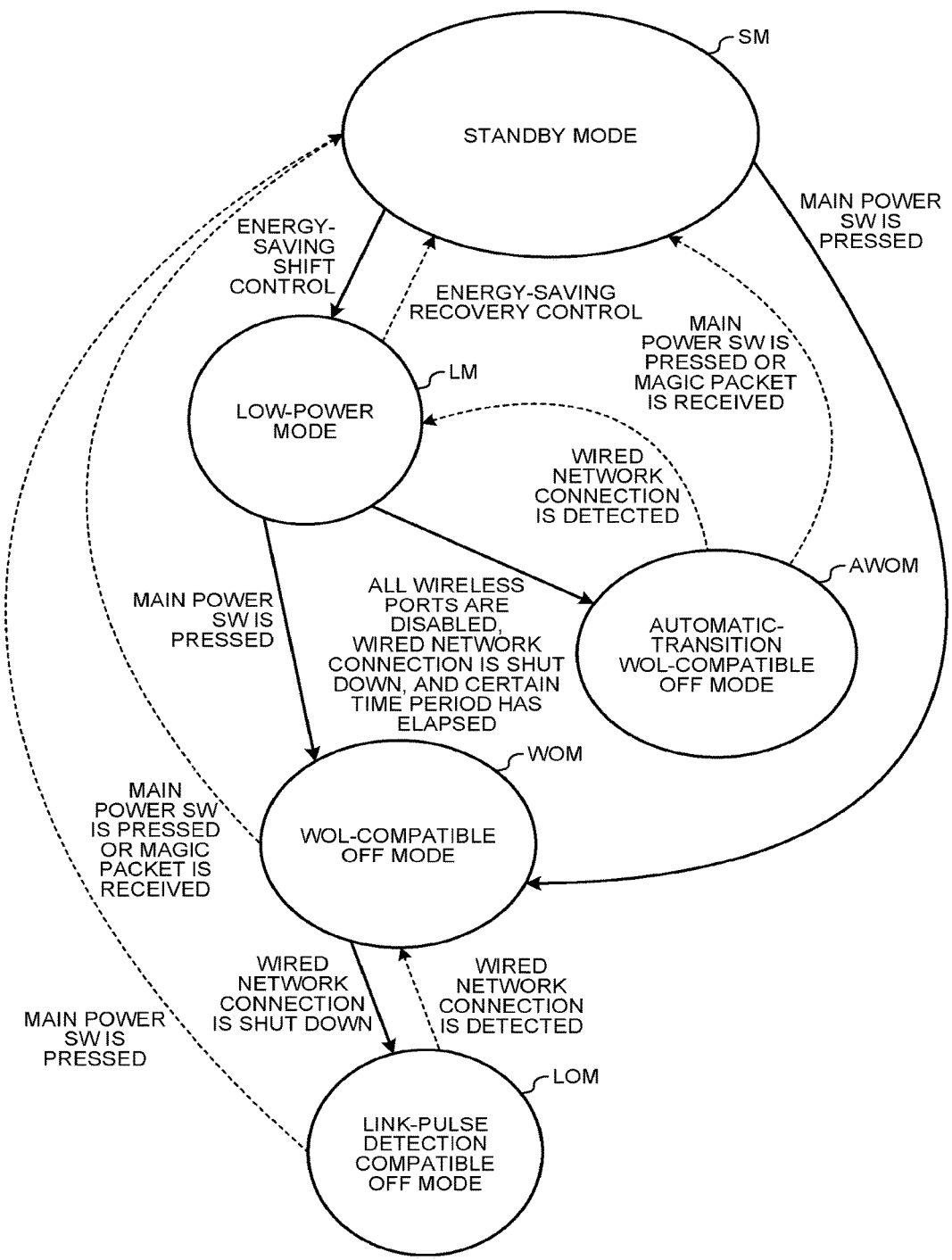
FIG. 39 is an example of the state transition diagram of the network device (the twelfth example)

FIG. 39 illustrates an example of the state transition diagram of the network device 10 according to the present example. Here, in FIG. 39, the differences from FIG. 33 are principally explained. In FIG. 39, the automatic-transition off mode AOM is replaced with an automatic-transition WOL-compatible off mode AWOM. As the communication processing unit 14 is in an energized state during the automatic-transition WOL-compatible off mode AWOM, a direct transition from the automatic-transition WOL-compatible off mode AWOM to the standby mode SM is possible.

The condition for transition from the low-power mode LM to the automatic-transition WOL-compatible off mode AWOM is that the wired network connection is shut down, all the wireless ports are disabled, and a certain time period has elapsed. Furthermore, the condition for transition from the automatic-transition WOL-compatible off mode AWOM to the low-power mode LM is that the wired network is connected. The condition for transition from the automatic-transition WOL-compatible off mode AWOM to the standby mode SM is that the main power switch is pressed or a magic packet is received.

Figure 40:
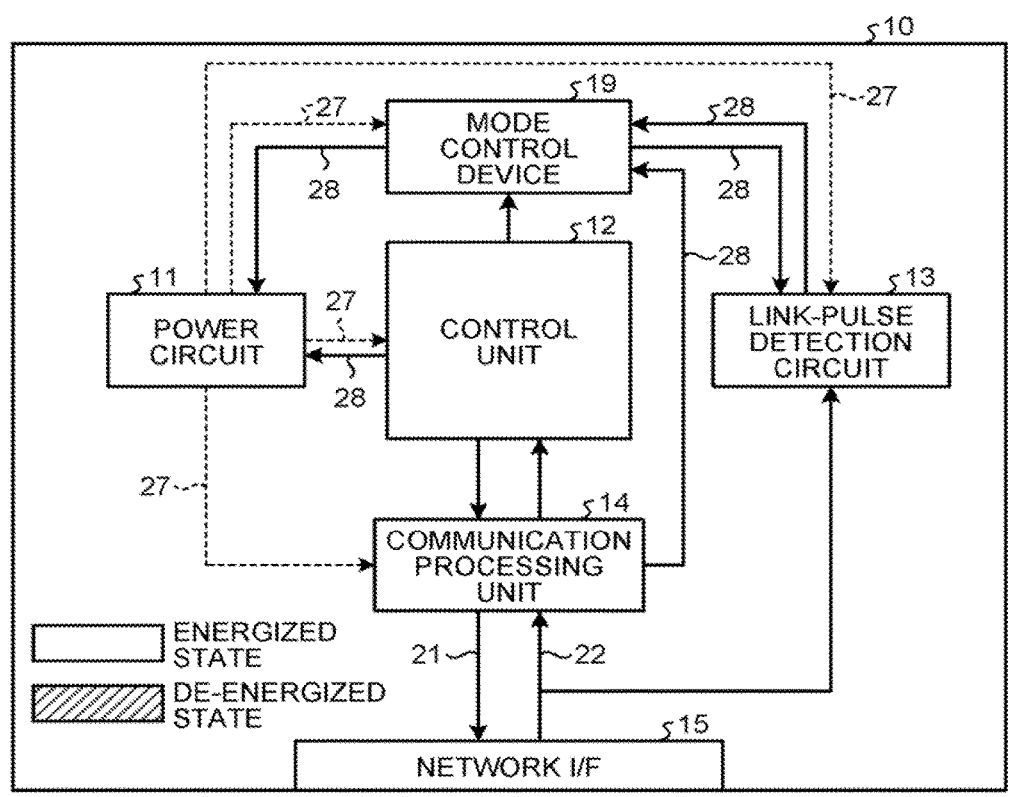
FIG. 40 is an example of the diagram that illustrates the power state during a standby mode and a low-power mode (the twelfth example)

FIG. 40 is an example of the diagram that illustrates the power state during the standby mode SM and the low-power mode LM. As illustrated in FIG. 40, the control unit 12, the communication processing unit 14, the link-pulse detection circuit 13, and the mode control device 19 are in an energized state during the standby mode SM and the low-power mode LM.

Figure 41:
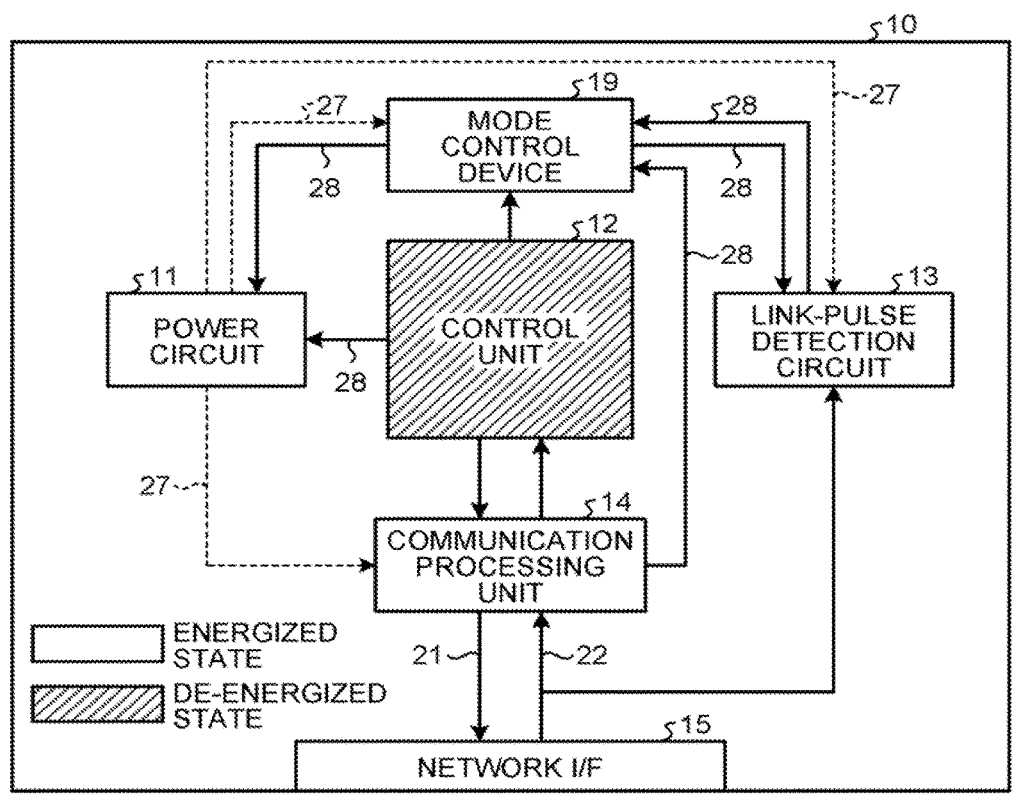
FIG. 41 is an example of the diagram that illustrates the power state during a WOL-compatible off mode and an automatic-transition WOL-compatible off mode (the twelfth example)

FIG. 41 is an example of the diagram that illustrates the power state during the WOL-compatible off mode WOM and the automatic-transition WOL-compatible off mode AWOM. As illustrated in FIG. 41, during the WOL-compatible off mode WOM and the automatic-transition WOL-compatible off mode AWOM, the communication processing unit 14, the link-pulse detection circuit 13, and the mode control device 19 are in an energized state, and the control unit 12 is in a de-energized state.

Figure 42:
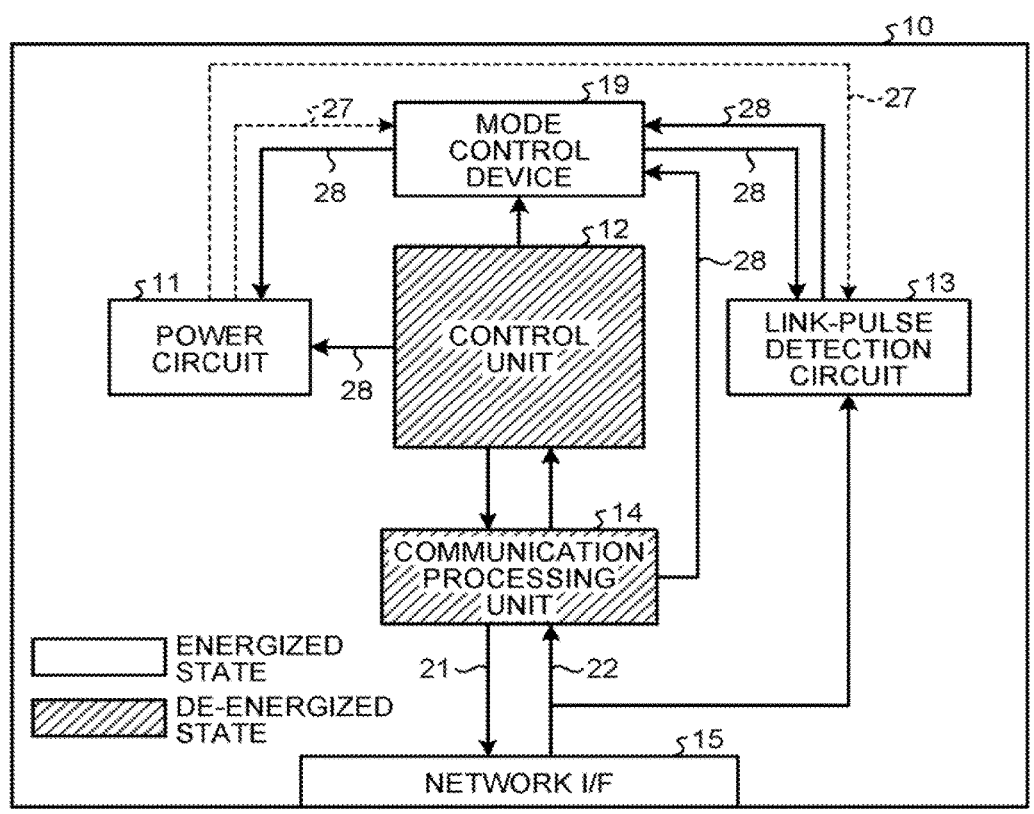
FIG. 42 is an example of the diagram that illustrates the power state in the link-pulse detection compatible off mode (the twelfth example)

FIG. 42 is an example of the diagram that illustrates the power state in the link-pulse detection compatible off mode LOM. As illustrated in FIG. 42, during the link-pulse detection compatible off mode LOM, the link-pulse detection circuit 13 and the mode control device 19 are in an energized state, and the control unit 12 and the communication processing unit 14 are in a de-energized state.

Figure 43:
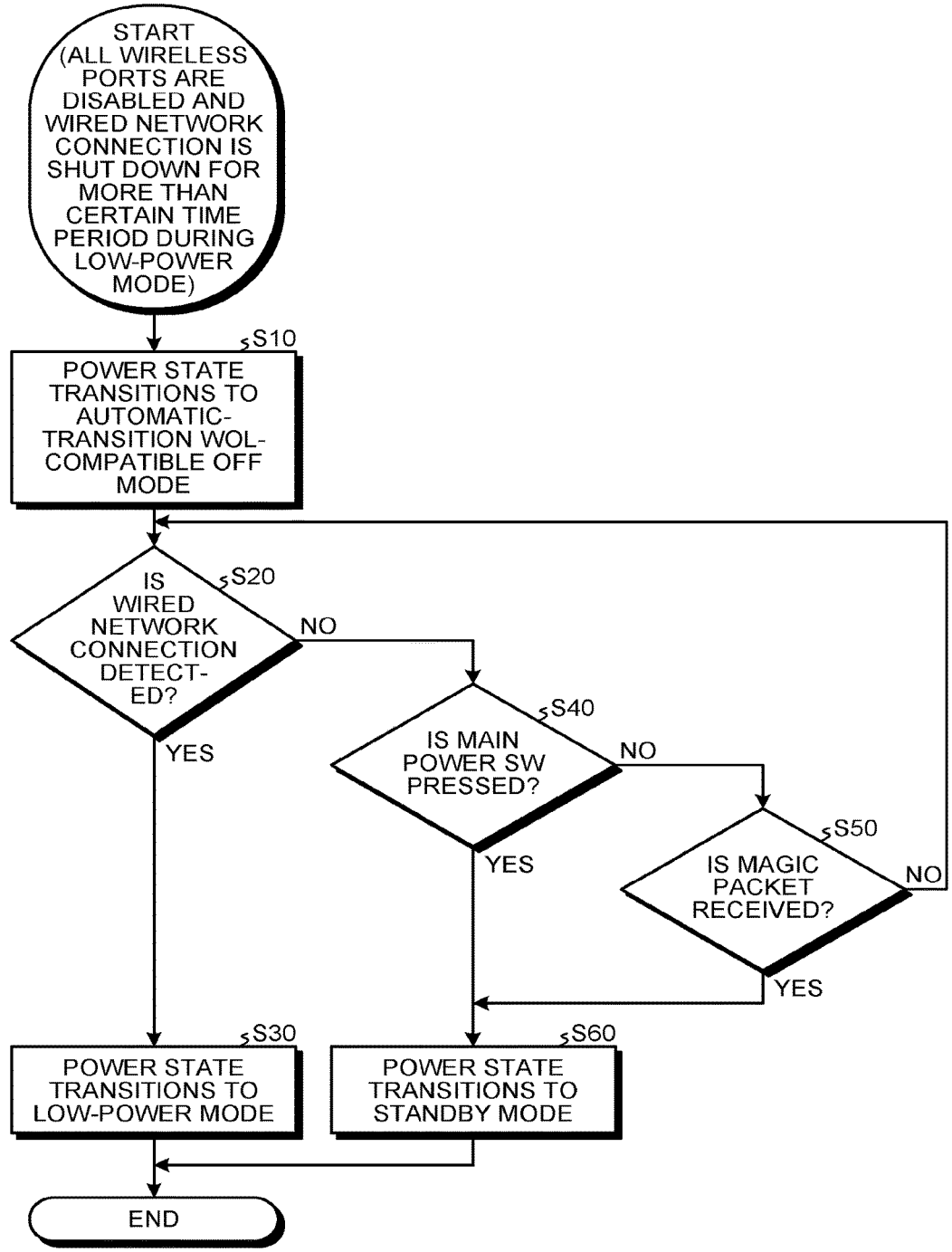
FIG. 43 is an example of the flowchart that illustrates the steps at which the power state transitions in the network device (the twelfth example).

FIG. 43 is an example of the flowchart that illustrates the steps at which the power state transitions in the network device 10 according to the present example. The process of FIG. 43 is started if the conditions are satisfied during the low-power mode LM, i.e., if the wired network connection is shut down, all the wireless ports are disabled, and a certain time period has elapsed.

First, the power-state control unit 12a makes the power state transition to the automatic-transition WOL-compatible off mode AWOM (S10). Specifically, the power circuit 11 is controlled so that the control unit 12 enters a de-energized state.

Then, the link-pulse detecting unit 13a determines whether the wired network is connected in the automatic-transition WOL-compatible off mode AWOM (S20). That is, it is determined whether a link pulse is detected.

If a determination at Step S20 is Yes, the wired network is connected, and therefore the second power-state control unit 19a, which receives a notification from the link-pulse detecting unit 13a, makes the power state transition to the low-power mode LM (S30). Specifically, the second power-state control unit 19a of the mode control device 19 controls the power circuit 11 so that the control unit 12 enters an energized state.

If a determination at Step S20 is No, the wired network is not connected, and therefore the interrupting unit 11a of the power circuit 11 determines whether the main power switch is pressed (S40).

If a determination at Step S40 is No, the second power-state control unit 19a of the mode control device 19 determines whether a magic packet is received (S50). That is, it is determined whether a notification that a magic packet has been received is received from the communication processing unit 14. If a determination at Step S50 is Yes, the process proceeds to Step S60.

If a determination at Step S40 is Yes, or if a determination at Step S50 is Yes, the second power-state control unit 19a of the mode control device 19 makes the power state of the network device 10 transition to the standby mode SM (S60).

Specifically, the second power-state control unit 19a of the mode control device 19 controls the power circuit 11 so that the control unit 12 enters an energized state. Therefore, if the wired network is disconnected in the low-power mode LM and the wired network is then connected, a transition may be made to the standby mode SM due to reception of a magic packet. Thus, it is possible to return to the standby mode SM quickly.

Furthermore, the transition in a case where the main power switch is pressed during the standby mode SM or the low-power mode LM is the same as in the tenth example.

Other Application Example

Although preferred embodiments for implementing the present invention are explained above using the examples, the present invention is not limited to the above examples, and various deformations and replacements may be made without departing from the scope of the present invention.

For example, in the present example, an explanation is given of the control on the power state due to disconnection and connection of the wired network; however, it is applicable to disconnection and connection of a wireless network. In this case, for example, the power state transitions depending on whether an access point of a wireless LAN is connectable to the network device 10 via the wireless LAN. Furthermore, the WOL may be received via a wireless LAN.

Furthermore, the low-power mode or the standby mode is an example of a first power state, the automatic-transition off mode is an example of a second power state, the off mode is an example of a third power state, the WOL-compatible off mode is an example of a fourth power state, the link-pulse detection compatible off mode is an example of a fifth power state, and the automatic-transition WOL compatible off mode is an example of a sixth power state. The mode control device 19 is an example of a second control unit, the link-pulse detection circuit 13 is an example of a confirmation-signal receiving unit, and the setting storage unit 17a is an example of a setting-information storage unit.

It is possible to provide a device that is unlikely to degrade the usability even if a transition is made to the off mode due to disconnection of a wired network.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device having a plurality of power states, the device comprising:
   a communication processing circuit configured to communicate with a communication destination device connected via a cable;
   a confirmation-signal receiving circuit configured to receive link pulses as a connection confirmation signal that is transmitted if connected to the communication destination device via the cable;
   a controller circuit configured to determine a power state depending on whether the confirmation-signal receiving circuit receives the connection confirmation signal; and
   a power circuit configured to control supply of electric power to at least one of the communication processing circuit and the controller circuit in accordance with the power state determined by the controller circuit, wherein
   if the confirmation-signal receiving circuit does not receive the connection confirmation signal in a first power state where electric power is supplied to the communication processing circuit and the controller circuit, the controller circuit is configured to determine that a transition is to be made to a fourth power state where electric power is supplied to the communication processing circuit but no electric power is supplied to the controller circuit, and
   if the communication processing circuit receives a start-up request signal for starting up the device, via the cable while in the fourth power state, the controller circuit is configured to determine that a transition is to be made to a power state where electric power is supplied to the controller circuit.

2. The device according to claim 1, wherein
   if the confirmation-signal receiving circuit does not receive the connection confirmation signal in a first power state where electric power is supplied to the communication processing circuit and the controller circuit, the controller circuit is configured to determine that a transition is to be made to a second power state where no electric power is supplied to the communication processing circuit and the controller circuit, and if the confirmation-signal receiving circuit receives the connection confirmation signal in the second power state, the controller circuit is configured to determine that a transition is to be made to the first power state.

3. The device according to claim 2, wherein
a reception signal line for the cable branches to the confirmation-signal receiving circuit and between an interface for the cable and the communication processing circuit,
the device further comprises a switch configured to switch between a connected state and a disconnected state of the reception signal line to the confirmation-signal receiving circuit, and
the switch is configured to be in the disconnected state while in the first power state, and the switch is configured to be in the connected state while in the second power state.

4. The device according to claim 2, further comprising a setting-information memory configured to store setting information as to whether a transition is to be made to the second power state, wherein
if the confirmation-signal receiving circuit does not receive the connection confirmation signal, the controller circuit is configured to determine whether a transition is to be made to the second power state in accordance with the setting information acquired from the setting-information memory.

5. The device according to claim 1, wherein if receiving the connection confirmation signal of equal to or more than a predetermined value in a unit of time, the confirmation-signal receiving circuit is configured to determine that the connection confirmation signal is received.

6. The device according to claim 1, further comprising a nonvolatile memory storing a flag that is set in response to a transition being made to second power state where no electric power is supplied to the communication processing circuit and the controller circuit, to indicate the second power state, wherein
the controller circuit is configured to clear the flag in response to a transition being made to a third power state where no electric power is supplied to the communication processing circuit, the controller circuit, and the confirmation-signal receiving circuit, and
in a case where the confirmation-signal receiving circuit does not receive the connection confirmation signal, the controller circuit is configured to determine that a transition is to be made to the second power state if the flag is set in the nonvolatile memory, and determine that a transition is to be made to the third power state if the flag is not set in the nonvolatile memory.

7. The device according to claim 1, wherein
a reception signal line for the cable branches to the confirmation-signal receiving circuit and between an interface for the cable and the communication processing circuit, and
a transmission signal line for the cable branches to the confirmation-signal receiving circuit and between an interface for the cable and the communication processing circuit.

8. The device according to claim 1, wherein
if the confirmation-signal receiving circuit receives the connection confirmation signal while in the fourth power state, the controller circuit is configured to keep the fourth power state, and
if the confirmation-signal receiving circuit does not receive the connection confirmation signal while in the fourth power state, the controller circuit is configured to determine that a transition is to be made to a third power state where no electric power is supplied to the communication processing circuit, the controller circuit, and the confirmation-signal receiving circuit.

9. The device according to claim 1, wherein
if the confirmation-signal receiving circuit receives the connection confirmation signal while in the fourth power state, the controller circuit is configured to keep the fourth power state,
if the confirmation-signal receiving circuit does not receive the connection confirmation signal while in the fourth power state, it is determined that a transition is to be made to a fifth power state where no electric power is supplied to the communication processing circuit and the controller circuit, and
if the confirmation-signal receiving circuit receives the connection confirmation signal while in the fifth power state, it is determined that a transition is to be made to the fourth power state.

10. The device according to claim 1, wherein
if the confirmation-signal receiving circuit does not receive the connection confirmation signal while in the first power state, the controller circuit is configured to determine that a transition is to be made to a second power state where no electric power is supplied to the communication processing circuit and the controller circuit, and
if the confirmation-signal receiving circuit receives the connection confirmation signal while in the second power state, the controller circuit is configured to determine that a transition is to be made to the first power state.

11. The device according to claim 10, wherein
if the confirmation-signal receiving circuit receives the connection confirmation signal while in the fourth power state, the controller circuit is configured to keep the fourth power state,
if the confirmation-signal receiving circuit does not receive the connection confirmation signal while in the fourth power state, it is determined that a transition is to be made to a fifth power state where no electric power is supplied to the communication processing circuit and the controller circuit, and
if the confirmation-signal receiving circuit receives the connection confirmation signal while in the fifth power state, it is determined that a transition is to be made to the fourth power state.

12. The device according to claim 1, wherein
if the confirmation-signal receiving circuit does not receive the connection confirmation signal while in a first power state where electric power is supplied to the communication processing circuit and the controller circuit, the controller circuit is configured to determine that a transition is to be made to a second power state where no electric power is supplied to the communication processing circuit and the controller circuit,
if the confirmation-signal receiving circuit does not receive the connection confirmation signal while in the second power state, the second power state is kept,
if the confirmation-signal receiving circuit receives the connection confirmation signal while in the second power state, the controller circuit is configured to determine that a transition is to be made to a fourth power state where electric power is supplied to the communication processing circuit but no electric power is supplied to the controller circuit, if the confirmation-signal receiving circuit receives the connection confirmation signal while in the fourth power state, the controller circuit is configured to keep the fourth power state, if the confirmation-signal receiving circuit does not receive the connection confirmation signal while in the fourth power state, it is determined that a transition is to be made to a fifth power state where no electric power is supplied to the communication processing circuit and the controller circuit, and if the confirmation-signal circuit receives the connection confirmation signal while in the fifth power state, it is determined that a transition is to be made to the fourth power state.

13. The device according to claim 1, further comprising a second controller circuit configured to determine a power state in a state where no electric power is supplied to the controller circuit, wherein if the confirmation-signal receiving circuit does not receive the connection confirmation signal while in a first power state where electric power is supplied to the communication processing circuit and the controller circuit, the controller circuit is configured to determine that a transition is to be made to a sixth power state where electric power is supplied to the communication processing circuit, the second controller circuit, and the confirmation-signal receiver but no electric power is supplied to the controller circuit, if the confirmation-signal receiving circuit receives the connection confirmation signal while in the sixth power state, the second controller circuit is configured to determine that a transition is to be made to the first power state, if the communication processor receiving circuit a start-up request signal for starting up the device while in the sixth power state, the second controller circuit is configured to determine that a transition is to be made to a power state where electric power is supplied to the controller circuit, if the confirmation-signal receiving circuit does not receive the connection confirmation signal while in a fourth power state where electric power is supplied to the communication processing circuit but no electric power is supplied to the controller circuit, it is determined that a transition is to be made to a fifth power state where no electric power is supplied to the communication processing circuit and the controller circuit, and if the confirmation-signal receiving circuit receives the connection confirmation signal while in the fifth power state, it is determined that a transition is to be made to the fourth power state.

14. An operation-mode control method implemented by a device having a plurality of power states, the operation-mode control method comprising:

by a communication processing circuit, communicating with a communication destination device connected via a cable;

by a confirmation-signal receiving circuit, receiving link pulses as a connection confirmation signal that is transmitted if being connected to the communication destination device via the cable;

by a controller circuit, determining a power state of at least three power states depending on whether the confirmation-signal receiving circuit receives the connection confirmation signal; and by a power circuit, controlling supply of electric power to at least one of the communication processing circuit and the controller circuit in accordance with the power state determined by the controller circuit and a current power state of the device, wherein if the connection confirmation signal are not received in a first power state where electric power is supplied to the communication processing circuit and the controller circuit, a transition is made to a fourth power state where electric power is supplied to the communication processing circuit but no electric power is supplied to the controller circuit, and if a start-up request signal for starting up the device is received, via the cable while in the fourth power state, a transition is made to a power state where electric power is supplied to the controller circuit.

15. A non-transitory computer readable recording medium including a computer program that when executed by a controller circuit of an information processing device having a plurality of power states, causes the controller circuit to perform a method comprising:

communicating, by a communication processing circuit of the information processing device, with a communication destination device connected via a cable;

receiving, by a confirmation-signal receiving circuit of the information processing device, link pulses as a connection confirmation signal that is transmitted if being connected to the communication destination device via the cable;

determining a power state states depending on whether the connection confirmation signal is received; and supplying electric power to at least one of a communication processing circuit and a controller circuit of the information processing device in accordance with the power state determined, wherein if the connection confirmation signal are not received in a first power state where electric power is supplied to the communication processing circuit and the controller circuit, a transition is made to a fourth power state where electric power is supplied to the communication processing circuit but no electric power is supplied to the controller circuit, and if a start-up request signal for starting up the information processing device is received, via the cable while in the fourth power state, a transition is made to a power state where electric power is supplied to the controller circuit.

* * * * *